United States Patent
Yamaji

(10) Patent No.: US 10,884,594 B2
(45) Date of Patent: Jan. 5, 2021

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/706,146

(22) Filed: Dec. 6, 2019

(65) Prior Publication Data

US 2020/0233569 A1 Jul. 23, 2020

(30) Foreign Application Priority Data

Jan. 18, 2019 (JP) ................. 2019-006664

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0482* (2013.01); *G06F 3/0483* (2013.01);
(Continued)

(58) Field of Classification Search
CPC .. G06F 3/04845; G06F 3/0483; G06F 3/0482; G06T 7/30; G06T 7/0012; G06T 11/60; G06T 2207/30196; G06K 9/00536; G06K 9/00677; H04N 1/00196; H04N 1/00456
See application file for complete search history.

(56) References Cited

U.S. PATENT DOCUMENTS

2006/0220983 A1* 10/2006 Isomura ................. G09B 29/10
345/1.1
2010/0172588 A1* 7/2010 Snowdon ........... H04N 1/00167
382/190
(Continued)

FOREIGN PATENT DOCUMENTS

JP 2010057073 A 3/2010
JP 6071189 B2 2/2017

*Primary Examiner* — Alex Olshannikov
(74) *Attorney, Agent, or Firm* — Studebaker & Brackett PC

(57) ABSTRACT

A user can simply edit a common page while securing equality between the numbers of appearances of persons on the common page.
In an image processing device, an image processing method, a program, and a recording medium according to the present invention, individual images and common images are selected from a plurality of images based an analysis result of images, a name of a specific individual, and association of a name of a person with a group of an image of the person. The individual images are laid out on an individual page, and the common images are laid out on a common page. One common image selected according to a command of the user is deleted as a deletion common image from a display common page, and images in which the same person as one or more persons of three or more persons appearing in the deletion common image appears are selected as addition candidate images from the plurality of images, and one addition candidate image of the addition candidate images is added to the display common page.

20 Claims, 11 Drawing Sheets

(51) Int. Cl.
*G06F 3/0483* (2013.01)
*G06F 3/0482* (2013.01)
*G06T 7/30* (2017.01)
*G06T 7/00* (2017.01)
*G06K 9/00* (2006.01)
*G06T 11/60* (2006.01)

(52) U.S. Cl.
CPC ........ *G06K 9/00536* (2013.01); *G06T 7/0012* (2013.01); *G06T 7/30* (2017.01); *G06T 11/60* (2013.01); *G06T 2207/30196* (2013.01)

(56) References Cited

U.S. PATENT DOCUMENTS

| | | | |
|---|---|---|---|
| 2013/0094721 A1* | 4/2013 | Kawasaki | G06F 16/58 382/118 |
| 2013/0145260 A1 | 6/2013 | Munekuni | |
| 2018/0164964 A1* | 6/2018 | Hori | G06K 9/46 |

* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2019-006664, filed on Jan. 18, 2019. The above application is hereby expressly incorporated by reference, in its entirety, into the present application.

BACKGROUND OF THE INVENTION

1. Field of the Invention

The present invention relates to an image processing device, an image processing method, a program, and a recording medium which create a photo album by using a plurality of images in which a plurality of persons appears.

2. Description of the Related Art

For example, yearbooks having the same contents for all preschoolers are created as yearbooks of kindergartens and preschools. That is, the yearbook includes a plurality of common pages used in common by all the preschoolers.

In a case where the yearbook is created, a plurality of images (photos) is generally classified on monthly basis, and is arranged on each page. A group image (group photo) in which many preschoolers appear is used with no feeling of unfairness. Since the group image is used, each preschooler appears so as to be small in each image. Accordingly, parents who view the yearbook are hard to know where their child is in the yearbook, and there is a need for a yearbook created such that the number of appearances of their child on the images of the yearbook is equal to the number of appearances of another child.

Here, the related arts related to the present invention include JP6071189B and

SUMMARY OF THE INVENTION

A first object of the present invention is to provide an image processing device, an image processing method, a program, and a recording medium capable of creating an individual page used only by a specific individual of a plurality of persons and further equalizing the numbers of appearances of the persons on images included in a common page used in common by the plurality of persons at the time of creating a photo album by using a plurality of images in which the plurality of persons appears. A second object of the present invention is to provide an image processing device, an image processing method, a program, and a recording medium with which a user can simply edit the common page while securing the equality between the numbers of appearances of the persons on the common page in addition to the first object.

In order to achieve the objects, the present invention provides an image processing device that creates a photo album including one or more individual pages which correspond to a specific individual and one or more common pages which correspond to a plurality of persons including the specific individual. The device comprises a processor configured to obtain a command input from a user, obtain a plurality of images in which the plurality of persons appears, analyze the plurality of images and detect a person appearing in each of the plurality of images, designate the specific individual among the plurality of persons according to a command of the user, select individual images used on the individual page and common images used on the common page from the plurality of images based on the analysis result of the plurality of images and the specific individual, count the number of appearances of each of the plurality of persons on the common images based on the analysis result of the plurality of images, and display, as a display individual page, the individual page in which the individual images are laid out on an image display and edit a layout of the display individual page according to a command of the user, and display, as a display common page, the common page in which the common images are laid out on the image display and edit a layout of the display common page according to a command of the user. The processor is configured to preferentially select, as the individual images, images in which two or less persons including the person corresponding to the specific individual appear, and select, as the common images, images which are other than the individual images and in which three or more persons appear such that the number of appearances of each person substantially becomes the average number of appearances of the plurality of persons, and in a case where the number of common images within the display common page is fixed and one common image selected according to a command of the user is deleted as a deletion common image from the display common page, the processor is configured to delete the deletion common image from the display common page, select, as addition candidate images, images which are other than the individual images and the common images and in which the same person as one or more persons of three or more persons appearing in the deletion common image appears from the plurality of images, and add one addition candidate image of the addition candidate images to the display common page.

It is preferable that the processor is configured to select, as the one addition candidate image, an addition candidate image in which all the same three or more persons as the three or more persons appearing in the deletion common image appear from the addition candidate images in preference to addition candidate images other than the addition candidate image in which all the same three or more persons as the three or more persons appearing in the deletion common image appear.

It is preferable that the processor is configured to repeatedly exclude persons from the three or more persons appearing in the deletion common image in order from a person having the largest number of appearances on the display common page to a person having the smallest number of appearances until there is an addition candidate image in which all the same persons as persons other than the person excluded from the three or more persons appearing in the deletion common image appear, and select, as the one addition candidate image, the addition candidate image in which all the same persons as the persons other than the person excluded from the three or more persons appearing in the deletion common image appear from the addition candidate images.

It is preferable that in a case where the number of appearances of each of the three or more persons appearing in the deletion common image on the display common page is one and there is no addition candidate image in which all the same three or more persons as the three or more persons appearing in the deletion common image appear among the addition candidate images, the processor is configured to delete common images by a count which corresponds to the number of persons appearing in the deletion common image minus one in addition to the deletion common image from the display common page, and add three or more addition candidate images in which each of the same three or more persons as the three or more persons appearing in the deletion common image appears instead of the one addition candidate image among the addition candidate images to the display common page.

It is preferable that the processor is configured to delete common images by a count which corresponds to the number of persons appearing in the deletion common image minus one in order from the common image in which the person having the largest number of appearances on the display common page appears to the common image in which the person having the smallest number of appearances appears.

It is preferable that in a case where the number of common images within the display common page is variable, the number of appearances of each of the three or more persons appearing in the deletion common image on the display common page is one, and there is no addition candidate image in which all the same three or more persons as the three or more persons appearing in the deletion common image appear among the addition candidate images, the processor is configured to delete the deletion common image from the display common page, and add three or more addition candidate images in which each of all the same three or more persons as the three or more persons appearing in the deletion common image appears instead of the one addition candidate image among the addition candidate images to the display common page.

It is preferable that the processor is further configured to register names of the plurality of persons, classify the plurality of images into a plurality of groups including the images in which each of the plurality of persons appears based on the analysis result of the plurality of images, associate the name of each person with each of the plurality of groups including the images in which the person corresponding to the name of each person appears, and lay the individual images out on the individual page and lay the common images out on the common page based on layout information. The processor is configured to designate a name of the specific individual among the names of the plurality of persons according to a command of the user, the processor is configured to select the individual images and the common images from the plurality of images based on the analysis result of the plurality of images, the name of the specific individual, and the association, the processor is configured to display, as the display individual page, the laid out individual page on the image display according to a command of the user, and display, as the display common page, the laid out common page on the image display according to a command of the user, and the processor is configured to preferentially select, as the individual images, images in which two or less persons including the person corresponding to the name of the specific individual appear.

It is preferable that the processor is configured to display the addition candidate images on the image display, and add one addition candidate image selected according to a command of the user from the addition candidate images displayed on the image display to the display common page.

It is preferable that the processor is configured to identifiably display an addition candidate image such that the number of appearances of each person on the display common page substantially becomes the average number of appearances of the plurality of persons among the addition candidate images displayed on the image display.

The present invention provides an image processing device that creates a photo album including one or more individual pages which correspond to a specific individual and one or more common pages which correspond to a plurality of persons including the specific individual. The device comprises a processor configured to obtain a command input from a user, obtain a plurality of images in which the plurality of persons appears, analyze the plurality of images and detect a person appearing in each of the plurality of images, designate the specific individual among the plurality of persons according to a command of the user, select individual images used on the individual page and common images used on the common page from the plurality of images based on the analysis result of the plurality of images and the specific individual, count the number of appearances of each of the plurality of persons on the common images based on the analysis result of the plurality of images, and display, as a display individual page, the individual page in which the individual images are laid out on an image display and edit a layout of the display individual page according to a command of the user, and display, as a display common page, the common page in which the common images are laid out on the image display and edit a layout of the display common page according to a command of the user. The processor is configured to preferentially select, as the individual images, images in which two or less persons including the person corresponding to the specific individual appear, and select, as the common images, images which are other than the individual images and in which three or more persons appear such that the number of appearances of each person substantially becomes the average number of appearances of the plurality of persons, and in a case where the number of common images within the display common page is fixed and one image which is other than the individual images and the common images and is selected according to a command of the user from the plurality of images is added as an addition common image to the display common page, the processor is configured to select, as replacement candidate images, common images in which the same person as one or more persons of all persons appearing in the addition common image appears from the display common page, delete one replacement candidate image of the replacement candidate images from the display common page, and add the addition common image to the display common page.

It is preferable that the processor is configured to select, as the one replacement candidate image, a replacement candidate image in which all the same persons as all the persons appearing in the addition common image appear from the replacement candidate images in preference to replacement candidate images other than the replacement candidate image in which all the same persons as all the persons appearing in the addition common image appear.

It is preferable that in a case where there is no replacement candidate image in which all the same persons as all the persons appearing in the addition common image appear among the replacement candidate images, the processor is configured to repeatedly exclude persons from all the persons appearing in the addition common image in order from a person having the largest number of appearances on the display common page to a person having the smallest number of appearances until there is a replacement candidate image in which all the same persons as persons other than the person excluded from all the persons appearing in the addition common image appear, and select, as the one replacement candidate image, the replacement candidate image in which all the same persons as the persons other than the person excluded from all the persons appearing in the addition common image appear from the replacement candidate images.

It is preferable that in a case where the addition common image is an image in which none of the plurality of persons appear, the processor is configured to select, as the one replacement candidate image, one common image of the common images in which the person having the largest number of appearances on the display common page appears from the replacement candidate images.

It is preferable that the processor is further configured to register names of the plurality of persons, classify the plurality of images into a plurality of groups including the images in which each of the plurality of persons appears based on the analysis result of the plurality of images, associate the name of each person with each of the plurality of groups including the images in which the person corresponding to the name of each person appears, and lay the individual images out on the individual page and lay the common images out on the common page based on layout information. The processor is configured to designate a name of the specific individual among the names of the plurality of persons according to a command of the user, the processor is configured to select the individual images and the common images from the plurality of images based on the analysis result of the plurality of images, the name of the specific individual, and the association, the processor is configured to display, as the display individual page, the laid out individual page on the image display according to a command of the user, and display, as the display common page, the laid out common page on the image display according to a command of the user, and the processor is configured to preferentially select, as the individual images, images in which two or less persons including the person corresponding to the name of the specific individual appear.

It is preferable that the processor is configured to display the replacement candidate images on the image display, and delete one replacement candidate image selected according to a command of the user from the replacement candidate images displayed on the image display from the display common page.

It is preferable that the processor is configured to identifiably display a replacement candidate image such that the number of appearances of each person on the display common page substantially becomes the average number of appearances of the plurality of persons among the replacement candidate images displayed on the image display.

It is preferable that in a case where one or more common images are selected as a deletion exclusion image from the display common page according to a command of the user, the processor is configured not to delete the deletion exclusion image from the display common page.

The present invention provides an image processing method of creating a photo album including one or more individual pages which correspond to a specific individual and one or more common pages which correspond to a plurality of persons including the specific individual. The method comprises obtaining, by a command obtaining unit, a command input from a user, obtaining, by an image obtaining unit, a plurality of images in which the plurality of persons appears, analyzing, by an image analysis unit, the plurality of images and detecting a person appearing in each of the plurality of images, designating, by an individual designation unit, the specific individual among the plurality of persons according to a command of the user, selecting, by an image selection unit, individual images used on the individual page and common images used on the common page from the plurality of images based on the analysis result of the plurality of images and the specific individual, counting, by an appearance number count unit, the number of appearances of each of the plurality of persons on the common images based on the analysis result of the plurality of images, and displaying, by a page editing unit, as a display individual page, the individual page in which the individual images are laid out on an image display and editing a layout of the display individual page according to a command of the user, and displaying, as a display common page, the common page in which the common images are laid out on the image display and editing a layout of the display common page according to a command of the user. In the selecting of the individual images and the common images, images in which two or less persons including the person corresponding to the specific individual appear are preferentially selected as the individual images, and images which are other than the individual images and in which three or more persons appear such that the number of appearances of each person substantially becomes the average number of appearances of the plurality of persons are selected as the common images, and in the editing of the layout of the display common page, in a case where the number of common images within the display common page is fixed and one common image selected according to a command of the user is deleted as a deletion common image from the display common page, the deletion common image is deleted from the display common page, images which are other than the individual images and the common images and in which the same person as one or more persons of three or more persons appearing in the deletion common image appears are selected as addition candidate images from the plurality of images, and one addition candidate image of the addition candidate images is added to the display common page.

The present invention provides an image processing method of creating a photo album including one or more individual pages which correspond to a specific individual and one or more common pages which correspond to a plurality of persons including the specific individual. The method comprises obtaining, by a command obtaining unit, a command input from a user, obtaining, by an image obtaining unit, a plurality of images in which the plurality of persons appears, analyzing, by an image analysis unit, the plurality of images and detecting a person appearing in each of the plurality of images, designating, by an individual designation unit, the specific individual among the plurality of persons according to a command of the user, selecting, by an image selection unit, individual images used on the individual page and common images used on the common page from the plurality of images based on the analysis result of the plurality of images and the specific individual, counting, by an appearance number count unit, the number of appearances of each of the plurality of persons on the common images based on the analysis result of the plurality of images, and displaying, by a page editing unit, as a display individual page, the individual page in which the individual images are laid out on an image display and editing a layout of the display individual page according to a command of the user, and displaying, as a display common page, the common page in which the common images are laid out on the image display and editing a layout of the display common page according to a command of the user. In the selecting of the individual images and the common images, images in which two or less persons including the person corresponding to the specific individual appear are preferentially selected as the individual images, and images which are other than the individual images and in which three or more persons appear such that the number of appearances of each person substantially becomes the average number of appearances of the plurality of persons are selected as the common images, and in the editing of the layout of the display common page, in a case where the number of common images within the display common page is fixed and one image which is other than the individual images and the common images and is selected according to a command of the user from the plurality of images is added as an addition common image to the display common page, common images in which the same person as one or more persons of all persons appearing in the addition common image appears are selected as replacement candidate images from the display common page, one replacement candidate image of the replacement candidate images is deleted from the display common page, and the addition common image is added to the display common page.

The present invention provides a non-transitory computer-readable recording medium having recorded thereon a program causing a computer to execute the steps of the image processing method recorded thereon.

According to the present invention, since it is possible to create the photo album including the individual pages, it is possible to create the photo album customized according to the specific individual of the plurality of persons, that is, each person. Since it is possible to equalize the number of appearances of each person on the common images included in the common page, it is possible to remove a feeling of unfairness among the plurality of persons. According to the present invention, in a case where the user deletes the deletion common image from the common page, the addition candidate image in which the same person as the person appearing in the deletion common image appears is added to the common page. In a case where the user adds the addition common image to the common page, the replacement candidate image in which the same person as the person appearing in the addition common image appears is deleted from the common page. Thus, it is possible to assist the user to simply edit the common page while securing the equality between the numbers of appearances of the persons on the common page as much as possible.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
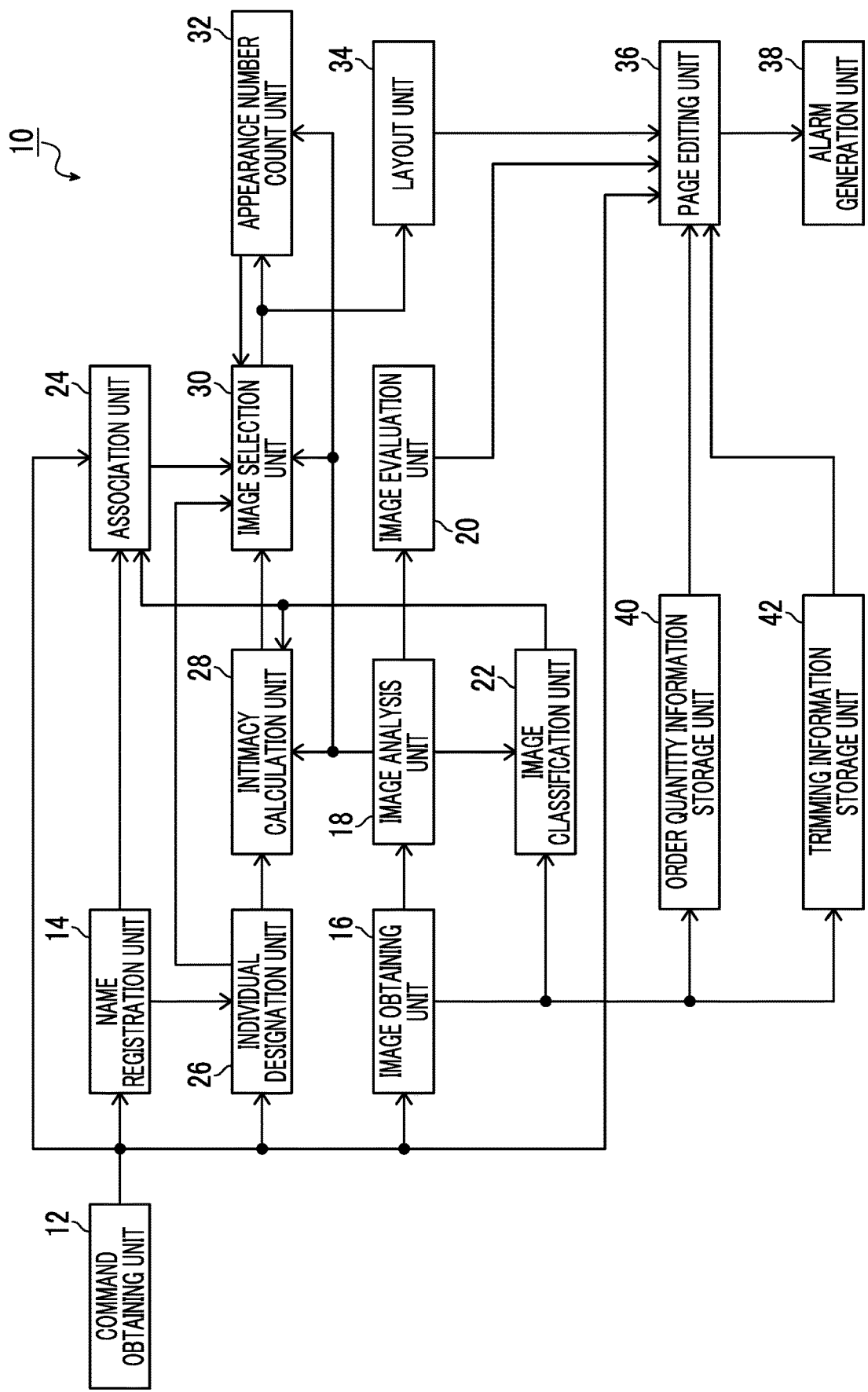
FIG. 1 is a block diagram of an embodiment showing a configuration of an image processing device according to an embodiment of the present invention.

FIG. 1 is a block diagram of an embodiment showing a configuration of an image processing device according to the embodiment of the present invention. An image processing device 10 shown in FIG. 1 creates a photo album (photo book) by using a plurality of images in which a plurality of persons appears. More specifically, the photo album including one or more individual pages used only by a specific individual and one or more common pages commonly used by the plurality of persons including the specific individual is created.

For example, in the case of a kindergarten and a preschool, the plurality of persons is a plurality of preschoolers, and the specific individual is one preschooler designated among the plurality of preschoolers. That is, the specific individual is each preschooler designated among the plurality of preschoolers. The image processing device 10 creates, as the photo album, a yearbook customized for each preschooler including an individual page of the specific individual and common pages common to the plurality of preschoolers.

As shown in FIG. 1, the image processing device 10 comprises a command obtaining unit 12, a name registration unit 14, an image obtaining unit 16, an image analysis unit 18, an image evaluation unit 20, an image classification unit 22, an association unit 24, an individual designation unit 26, an intimacy calculation unit 28, an image selection unit 30, an appearance number count unit 32, a layout unit 34, a page editing unit 36, an alarm generation unit 38, an order quantity information storage unit 40, and a trimming information storage unit 42.

In the image processing device 10, the command obtaining unit 12 obtains various commands input from a user.

Subsequently, the name registration unit 14 registers names of the plurality of persons according to a command of the user obtained by the command obtaining unit 12, for example. The name registration unit 14 may register the names of the plurality of persons based on information of a list of the names of the plurality of persons.

Subsequently, the image obtaining unit 16 obtains a plurality of images in which the plurality of persons appears according to a command of the user and which is used for the photo album, for example. The image obtaining unit 16 may obtain a plurality of image stored in a storage location set in advance.

Subsequently, the image analysis unit 18 analyzes the plurality of images obtained by the image obtaining unit 16.

An analysis item of the image is not particularly limited, and includes analysis of an image content such as subject detection (person detection and object detection) for detecting a subject appearing in the image, face detection and face recognition of the person, face size detection for detecting a size of a face of the person, and distance detection for detecting a distance between the persons appearing in the image, analysis of quality of the image such as brightness, hue, contrast, and a degree of blurriness of the image, and analysis of time information (imaging date and time) and positional information (imaging location) included in additional information of the image such as exchangeable image file format (Exit).

Subsequently, the image evaluation unit 20 evaluates the images based on the analysis result of the plurality of images using the image analysis unit 18, and calculates scores.

The method of calculating the scores of the images is not particularly limited, and for example, a score of each analysis item and a total score of all the analysis items using the image analysis unit 18 may be calculated for each image. The method of calculating the score of each analysis item is also not particularly limited. For example, a score in a case where the size of the face of the person appearing in the image may be set to be larger is higher than in a case where the size of the face of the person is smaller, or a score in a case where the degree of blurriness of the image is lower may be set to be larger than in a case where degree of blurriness of the image is higher. The same is true of other analysis items.

Subsequently, the image classification unit 22 classifies the plurality of images into a plurality of groups including the images in which each of the plurality of persons appears based on the analysis result of the plurality of images, for example, the analysis result of the face detection and face recognition.

Subsequently, the association unit 24 associates the name of each person registered in the name registration unit 14 with each of the plurality of groups including the image in which the person corresponding to the name of each person appears which is classified by the image classification unit 22 according to a command of the user. The association unit 24 may perform the association based on information of association of the name of each person with the group of each image.

Subsequently, the individual designation unit 26 designates the name of the specific individual among the names of the plurality of persons registered in the name registration unit 14 according to a command of the user.

Subsequently, the intimacy calculation unit 28 calculates a degree of intimacy between the specific individual and each person other than the specific individual based on the analysis result of the plurality of images, the name of the specific individual designated by the individual designation unit 26, and the association of the name of each person with the group of each image performed by the association unit 24.

The method of calculating the degree of intimacy is not particularly limited. For example, since a person who appears with the specific individual in many images, a person who appears with less persons in the image in which this person appears with the specific individual, and a person within a short distance with the specific individual in the image in which this person appears with the specific individual are regarded as persons having a high degree of intimacy with the specific individual, it is possible to set a degree of intimacy between each person and a specific person to be higher than a degree of intimacy between another person and the specific person.

Subsequently, the image selection unit 30 selects individual images used in the individual pages and common images used in the common pages from the plurality of images based on the analysis result of the plurality of images, the name of the specific individual designated by the individual designation unit 26, the association of the name of each person with each group, and the degree of intimacy between the specific individual and each person other than the specific individual calculated by the intimacy calculation unit 28.

Subsequently, the appearance number count unit 32 counts the number of appearances of each person on the common image selected by the image selection unit 30 based on the analysis result of the plurality of images using the image analysis unit 18, that is, the analysis result of the person detection. For example, the appearance number count unit 32 counts the number of appearances of each person on the common pages and the number of appearances of each person in the entire photo album.

Subsequently, the layout unit 34 lays the individual images selected by the image selection unit 30 outs on the individual pages, and lays the common images out on the common pages based on layout information for designating layouts of the photo album. The layout unit 34 creates the photo album including a front page, individual pages, common pages, special pages, and a rear page.

Subsequently, the page editing unit 36 displays, a display individual page, the individual page laid out on an image display unit such as a liquid crystal display by the layout unit 34, and edits a layout of the display individual page according to a command of the user. The page editing unit 36 displays, as display common page, the common page laid out on the image display unit by the layout unit 34, and edits a layout of the display common page according to a command of the user.

Subsequently, the alarm generation unit 38 produces various alarms including an alarm for confirming whether or not to delete deletion candidate images to be described below and an alarm related to the number of appearances of each person on the common pages before the deletion candidate images are deleted from the display common pages by the page editing unit 36.

In a case where the number of appearances of the specific person on the common images is greater than the average number of appearances of the plurality of persons on the display common pages, the deletion candidate images are candidate images as targets to be deleted among the common images in which the specific person appears.

Subsequently, the order quantity information storage unit 40 stores information of an order quantity of the image ordered to be printed among the plurality of images.

Subsequently, the trimming information storage unit 42 stores trimming information of the image ordered to be printed among the plurality of images after the image is trimmed.

Figure 2:
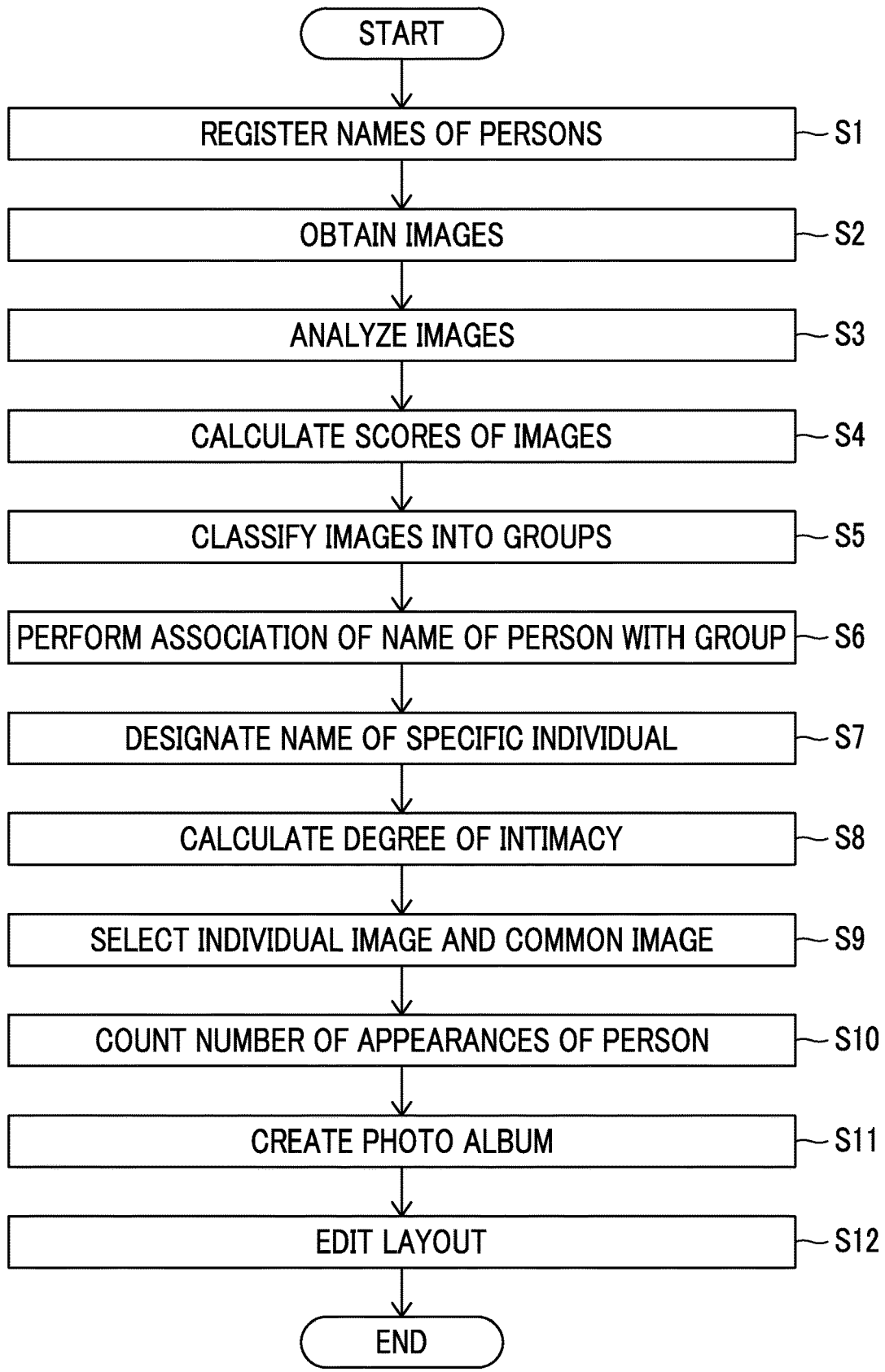
FIG. 2 is a flowchart showing an operation of the image processing device.

Next, an operation of the image processing device 10 will be described with reference to a flowchart shown in FIG. 2.

In the following description, an example in which the yearbook of the kindergarten and the preschool is created as the photo album will be described.

Figure 3:
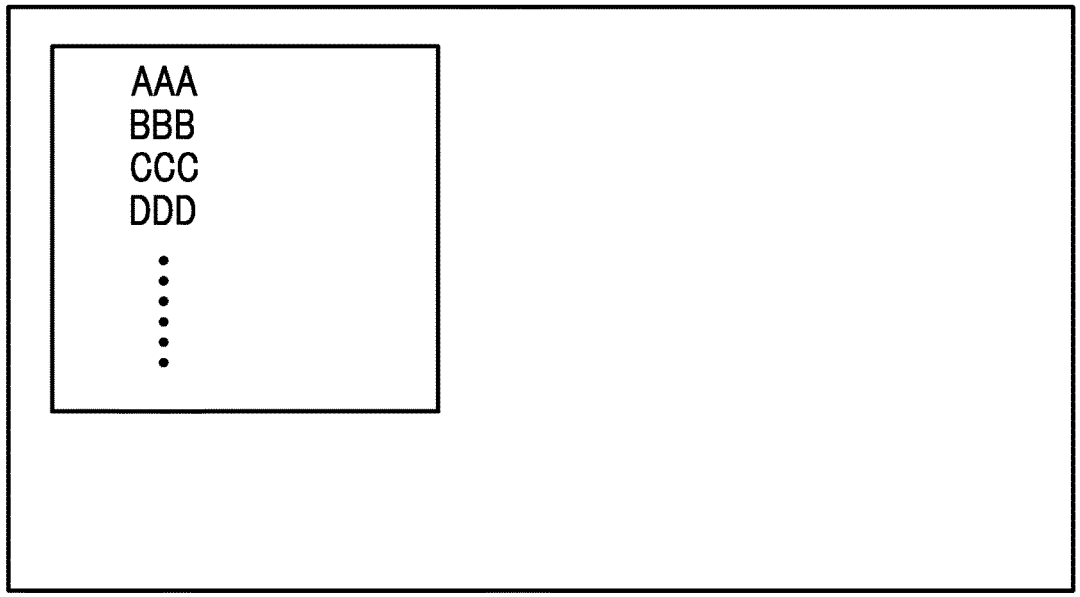
FIG. 3 is a conceptual diagram showing an input screen for designating names of a plurality of persons.

In a case where the photo album is created, the user of the image processing device 10 initially inputs a command for designating the names of the plurality of persons through, for example, the command obtaining unit 12, as shown in FIG. 3.

In the case of the kindergarten and the preschool, the user of the image processing device 10 is, for example, a teacher.

In FIG. 3, on an input screen of a name of the preschooler, names of the plurality of preschoolers, for example, names of AAA, BBB, CCC, . . . are input by the teacher.

In a case where the command for designating the names of the plurality of persons is input, the names of the plurality of persons input according to the command of the user are registered by the name registration unit 14 (step S1).

Subsequently, the user inputs the command for designating the plurality of images through, for example, the command obtaining unit 12.

In a case where the plurality of images is designated, the plurality of images designated according to the command of the user is obtained by the image obtaining unit 16 (step S2).

The image obtaining unit 16 can obtain, but not particularly limited to, various images such as images captured by teachers and photographers in an event of the kindergarten and the preschool and images captured by parents of the preschooler at home of each preschooler.

In a case where the plurality of images is obtained, the plurality of image is analyzed by the image analysis unit 18 (step S3).

Subsequently, the images are evaluated based on the analysis result of the plurality of images, and the scores are calculated by the image evaluation unit 20 (step S4).

Figure 4:
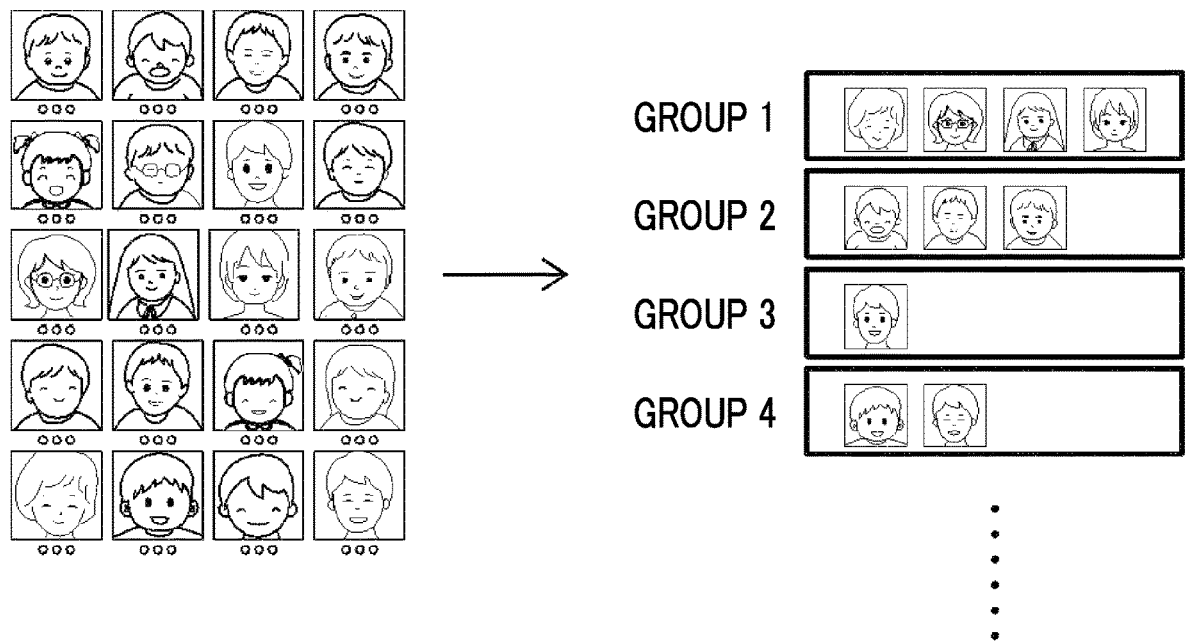
FIG. 4 is a conceptual diagram showing a state in which a plurality of images is classified into a plurality of groups including images in which each person appears.

As shown in FIG. 4, the plurality of images is classified into the plurality of groups including the images in which each of the plurality of persons appears based on the analysis result of the plurality of images by the image classification unit 22 (step S5).

In FIG. 4, the plurality of images (left side of FIG. 4) in which the preschoolers appear is classified into group 1, group 2, group 3, . . . (right side of FIG. 4) including the images in which the preschoolers appear.

Figure 5:
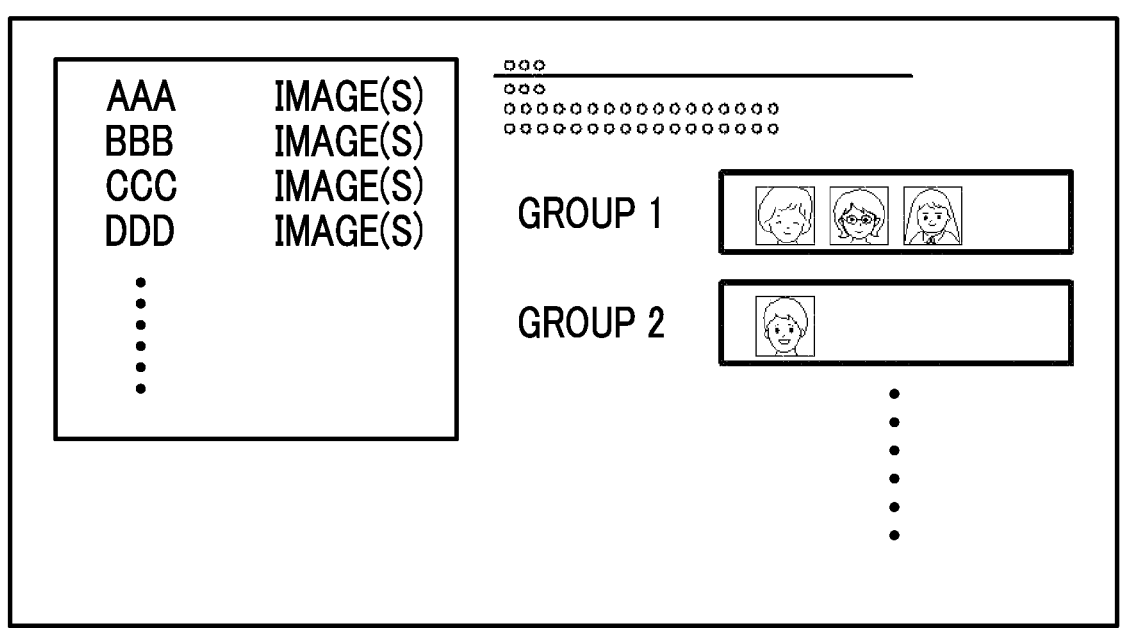
FIG. 5 is a conceptual diagram showing a list of the names of the plurality of persons, the number of images of each person, and the number of images of each group classified for each person.

In a case where the images are classified into the groups for each person, the list of the names of the plurality of persons registered in the name registration unit 14, the number of images of each person, and the images of each group classified for each person are displayed on the image display unit, as shown in FIG. 5.

In FIG. 5, the list of the plurality of preschoolers (left side of FIG. 5), the number of images of each preschooler (center of FIG. 5), and groups 1, 2, 3, . . . (right side of FIG. 5) of the images in which the preschoolers appear are displayed.

Subsequently, the user inputs a command for designating the association of the name of each person displayed on the image display unit with each group including the image in which the person corresponding to the name of each person appears through, for example, the command obtaining unit 12.

In a case where the command of the association of the name of the person with the group of the image is input, the association of the name of each person with each group including the image in which the person corresponding to the name of each person appears is performed by the association unit 24 according to a command of the user (step S6).

The association of the name of the person with the group of the image may be performed on monthly basis, or may be performed before the photo album is created. In a case where the association of the name of the person with the group of the image is performed once, the persons appearing in each image are detected from each of the subsequently captured images by the image analysis unit 18, and each image is automatically classified into the group including the images in which each person appears by the image classification unit 22 based on the analysis result of the plurality of images.

Subsequently, the user inputs information for designating, as the name of the specific individual, the name of one person among the names of the plurality of persons registered in the name registration unit 14 through the command obtaining unit 12.

In a case where the name of the specific individual is input, the name of the specific individual is designated among the names of the plurality of persons registered in the name registration unit 14 by the individual designation unit 26 according to a command of the user (step S7).

The method of designating the name of the specific individual is not particularly limited. For example, the user can select the name of one person among the list of the name of the plurality of persons displayed on the image display unit, and can designate, as the name of the specific individual, the selected name. In this case, the individual designation unit 26 designates, as the name of the specific individual, the name of one person selected according to a command of the user from the list of the names of the plurality of persons displayed on the image display unit.

Subsequently, the degree of intimacy between the specific individual and each person other than the specific individual is calculated based on the analysis result of the plurality of images, the name of the specific individual, and the association of the name of each person and the group of each image by the intimacy calculation unit 28 (step S8).

Subsequently, the individual images and the common image are selected from the plurality of images by the image selection unit 30 based on the analysis result of the plurality of images, the name of the specific individual, the association, and the degrees of intimacy (step S9).

The image selection unit 30 preferentially selects images in which two or less persons including the person corresponding to the name of the specific individual appear in order to select, as the individual images, the images in which the specific individual appears. Images which are other than the individual images and in which three or more persons appear are selected as the common images. An upper limit of the number of persons appearing in the common images is not limited. It is desirable that the common images are images in which the specific person of the plurality of persons is not remarkable.

Subsequently, the number of appearances of each person on the common images is counted based on the analysis result of the plurality of images by the appearance number count unit 32 (step S10).

In a case where the number of appearances of each person is counted, the images which are other than the individual images and in which three or more persons appear are selected from the plurality of images such that the number of appearances of each person becomes the average number of appearances of the plurality of persons by the image selection unit 30 in order to select, as the common images, the images without feeling unfair among the plurality of persons. Accordingly, it is possible to equalize the number of appearances of each person on the common images for the plurality of persons.

Subsequently, the user inputs the layout information through the command obtaining unit 12.

TABLE 1

| No. | Item | Details |
|---|---|---|
| 1 | Size | A4, A5, . . . |
| 2 | Number of pages | 10P, 15P, 20P, . . . |
| 3 | Number of images of each page | smaller, normal, larger |
| 4 | Special page: presence or absence of individual page and page position | presence, 3-4 pages |
| 5 | Special page: presence or absence of preschooler list page and page position | presence, 1-2 pages |
| 6 | Special page: presence or absence of teacher list page and page position | . . . |
| 7 | Others: case where there is special page | . . . |
| 8 | Period of image | 1 year, 2 years, 3 years |
| 9 | . . . | |

As represented in Table 1, the layout information includes, but not particularly limited to, a size of the photo album, the number of pages, the number of images for each page, the presence or absence of a special page and a page position thereof, and information of an imaging period of the image. The special page includes a preschooler list page on which face images of the preschoolers are displayed as a list, a teacher list page on which face images of the teachers are displayed as a list, and other special pages in addition to the individual pages.

The size of the photo album is information such as A4, A5, . . . , the number of pages thereof is information such as 10 pages (P), 15P, 20P, . . . , and the number of images for each page is information such as smaller, normal, and larger. The presence or absence of the individual page and the page position thereof is information such as "presence, 3-4 pages", and the presence or absence of the preschooler list page and the page position thereof is information such as "presence, 1-2 pages". The imaging period of the image is information such as 1 year, 2 years, 3 years, . . . .

Figure 6:
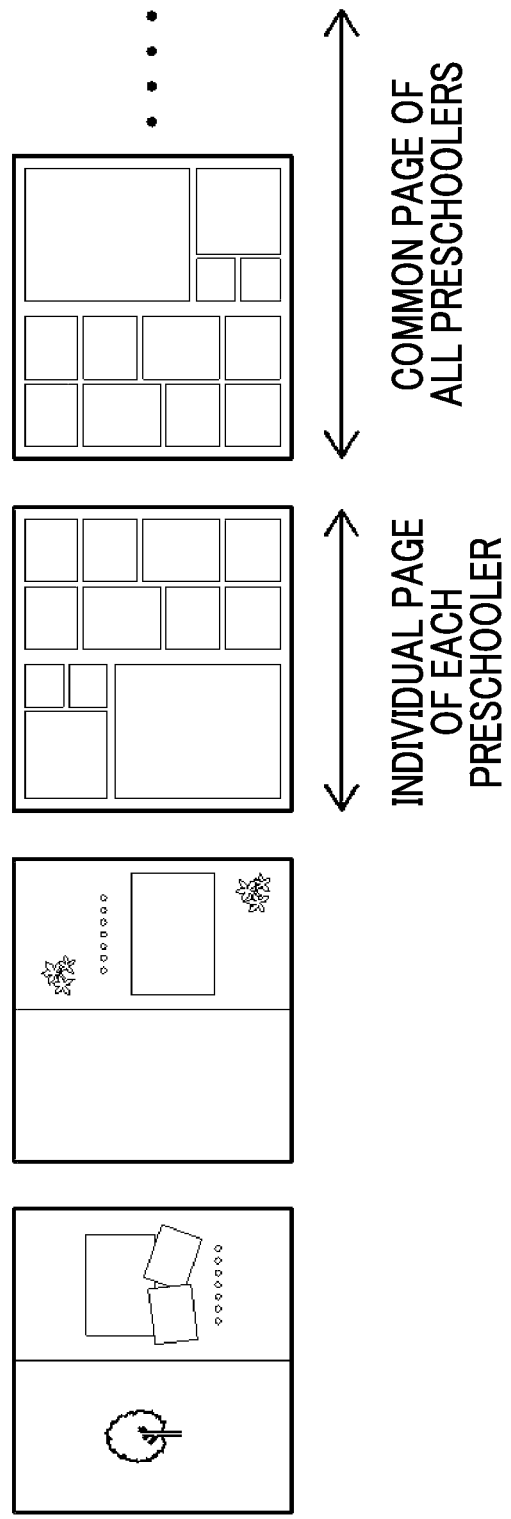
FIG. 6 is a conceptual diagram showing each page of the photo album.

In a case where the layout information is input, the individual images are laid out on the individual pages, and the common images are laid out on the common pages based on the layout information by the layout unit 34. As shown in FIG. 6, for example, the photo album including the front page, the individual pages of each preschooler, the common pages of all the preschoolers, the special pages, and the rear page is created as the yearbook (step S11).

The user can display each page of the photo album on the image display unit, and can edit the displayed page according to a command of the user. For example, in a case where the individual page is edited, the user inputs a command for designating the individual page to be edited.

Figure 7:
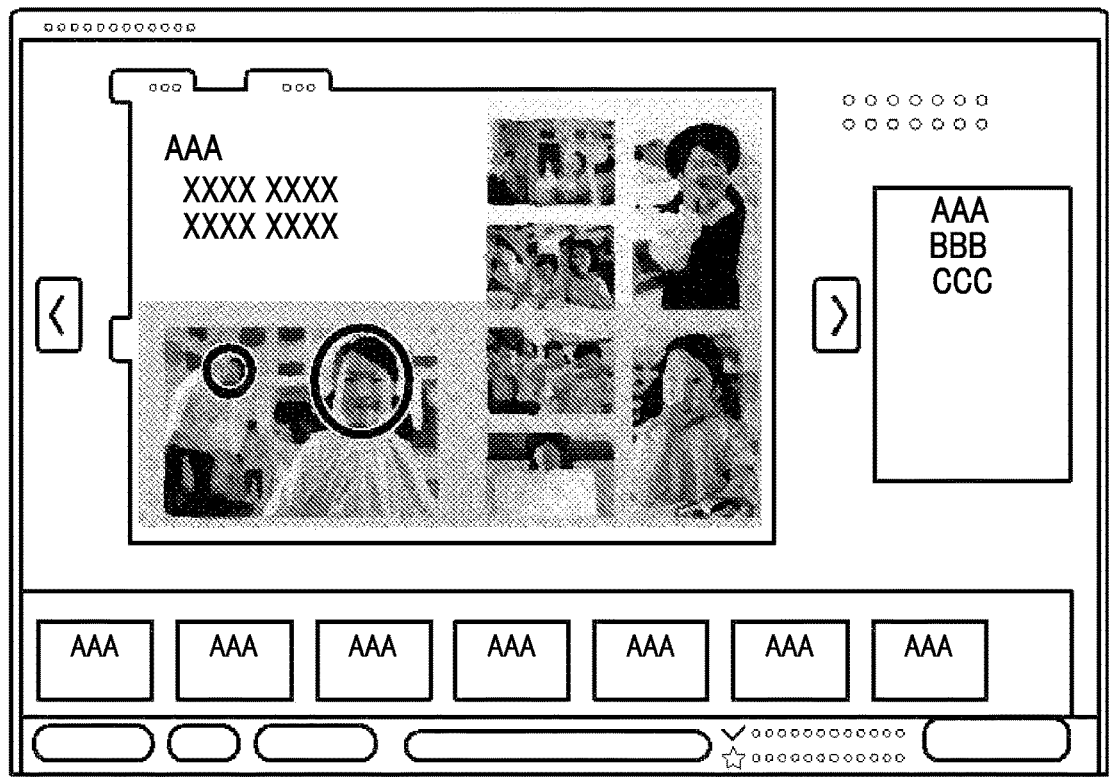
FIG. 7 is a conceptual diagram showing an editing screen of an individual page.

In a case where the command for designating the individual page is input, the individual page is displayed as the display individual page on the image display unit by the page editing unit 36 according to a command of the user, as shown in FIG. 7.

FIG. 7 is an example of an editing screen of the individual page.

For example, the individual page which is a two-page spread page is displayed in a region from an upper left portion of the editing screen to a central portion thereof. Edit buttons such as "replace" of the images and "remove" of the image are displayed at an upper portion of the individual page, and buttons for displaying the next and previous individual pages are displayed on a right side and a left side of the individual page. An image of the name (AAA) of the specific individual corresponding to this individual page and a character string indicating a comment (XXXX) is laid out at an upper left portion within the individual page by the layout unit 34.

The list of the names of the preschoolers, that is, AAA, BBB, CCC, . . . are displayed in a region from an upper right portion of the editing screen to a right center portion.

Editing candidate images for editing the individual page are displayed in a region from a lower left portion of the editing screen to a lower right portion.

Subsequently, the user inputs a command for editing the display individual page such as replacement, deletion, addition, enlargement and reduction, and trimming of the image.

In a case where the command for editing the display individual page is input, the layout of the display individual page is edited by the page editing unit 36 according to a command of the user (step S12).

Similarly, in a case where the common page is edited, the user inputs a command for designating the common page to be edited.

In a case where the command for designating the common page is input, the common page is displayed as the display common page on the image display unit by the page editing unit 36 according to a command of the user.

Subsequently, the user inputs a command for editing the display common page.

In a case where the command for editing the display common page is input, the layout of the display common page is edited by the page editing unit 36 according to a command of the user (step S12).

The photo album is basically edited by the teacher of the kindergarten and the preschool, but only the individual page may be edited by, for example, the parents of each preschooler in addition to the teacher. For example, the parents may access to and log on the image processing device 10 by using an application of a smartphone for using the image processing device 10, and then may edit only the individual page of their child.

In a case where the user finishes the editing of each page of the photo album, the user can order the prints of the photo albums of the plurality of persons. After the creation of the photo albums of all the persons is finished, the user may order the prints of the photo albums of all the persons at once, or may individually order the print of the photo album of each person whenever the creation of the photo album of each person is ended.

In the image processing device 10, since it is possible to create the photo album including the individual pages, it is possible to create the photo album customized according to the specific individual of the plurality of persons, that is, each person. Since it is possible to equalize the number of appearances of each person on the common images included in the common page, it is possible to remove a feeling of unfairness among the plurality of persons.

In a case where the individual page is designated, as shown in FIG. 7, for example, the individual designation unit 26 can designate, as the name of the specific individual, the name of one person selected according to a command of the user from the list of the names of the plurality of persons displayed on the image display unit.

In this case, the individual page of the person corresponding to the name of one person designated by the individual designation unit 26 is displayed as the display individual page on the image display unit by the page editing unit 36.

Accordingly, the user can display an individual page of a desired person on the image display unit by selecting a name of the desired person from the list of the names of the plurality of persons, and can view the displayed individual page.

The page editing unit 36 may select the images in which the person corresponding to the name of one person designated by the individual designation unit 26 appears among the plurality of images, and may preferentially display, as the editing candidate images for editing the display individual page on the image display unit, as shown in FIG. 7.

Accordingly, in a case where the display individual page is edited, the user can easily select the images in which the person corresponding to the display individual page appears from the plurality of images, and can use the selected image.

In a case where the individual images are displayed on the display individual page, for example, the image analysis unit 18 may detect the faces of the persons appearing in the individual images laid out on the display individual page, and the page editing unit 36 may distinguishably display a face frame surrounding a face region of the person for each person based on the detection results of the faces on the individual images laid out on the display individual page, as shown in FIG. 7. For example, a color, a thickness, and a line type of the face frame may be changed for each person.

Accordingly, the user can easily distinguish between the person corresponding to the display individual page and another person on the individual image.

TABLE 2

| Name | Entire | Display common page |
|------|--------|---------------------|
| AAA  | 10     | 1                   |
| BBB  | 7      | 2                   |
| CCC  | 8      | 0                   |
| ...  | ...    | ...                 |

TABLE 3

| Name | Entire | 1-2P | 3-4P | 5-6P | ... |
|------|--------|------|------|------|-----|
| AAA  | 15     | 1    | 2    | 1    | ... |
| BBB  | 7      | 2    | 0    | 0    | ... |
| CCC  | 2      | 0    | 1    | 0    | ... |
| ...  | ...    | ...  | ...  | ...  | ... |

In a case where the display common page is displayed, the page editing unit 36 may display the entire photo album on the display common page and the numbers of appearances of the persons, that is, AAA, BBB, CCC, . . . on the display common page on the image display unit, as represented in Table 2.

Alternatively, as represented in Table 3, the numbers of appearances of the persons, that is, AAA, BBB, CCC, . . . on the entire photo album and each of one or more common pages of the display common page, for example, 1-2 pages (P), 3-4 P, 5-6 P, . . . , may be displayed on the image display unit.

Accordingly, the user can easily ascertain the number of appearances of each person on the common images of the entire photo album and each common page, and can simply check whether or not there is an imbalance between the numbers of appearances of the persons for each page such as a case where the person appears only on the specific page even though the number of appearances is large.

Figure 8:
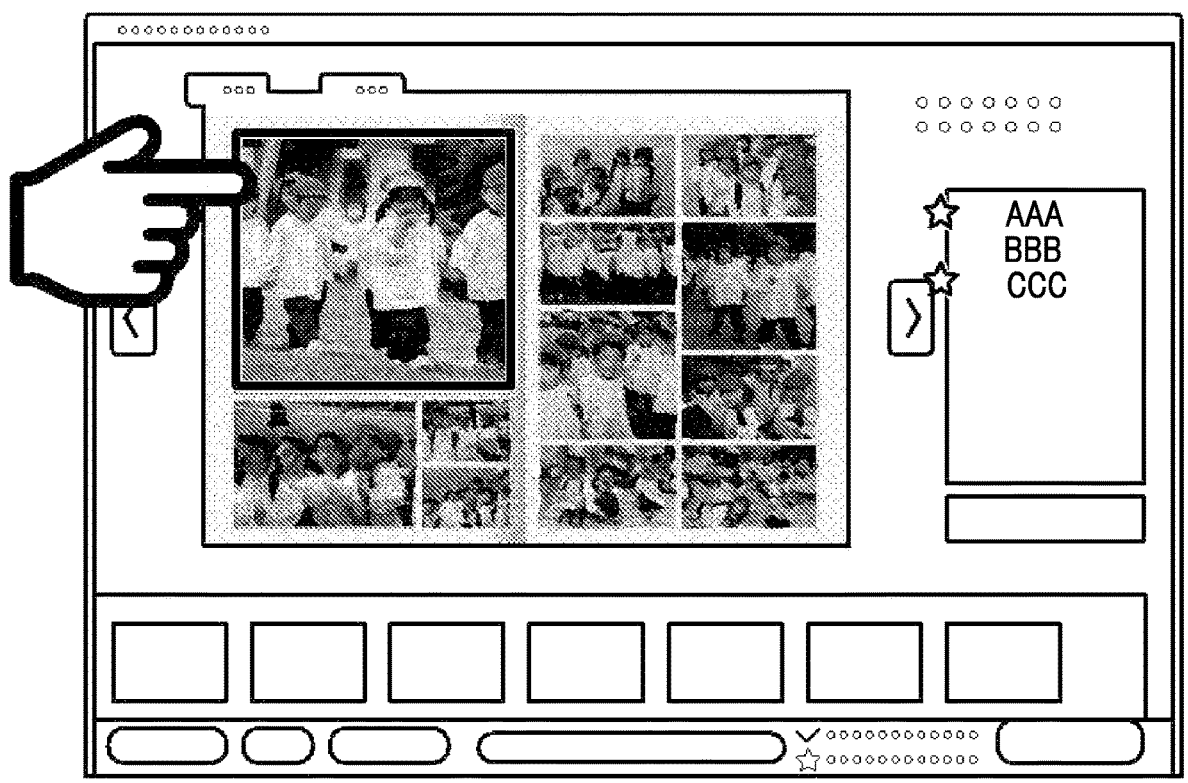
FIG. 8 is a conceptual diagram showing a state in which the name of the person corresponding to the person appearing in the image is identifiably displayed in the list of the names of the plurality of persons.

As shown in FIG. 8, the page editing unit 36 may display the list of the names of the plurality of persons on the image display unit, and may identifiably display the name of the person corresponding to the person appearing in the individual image or the common image (indicated by a finger mark in FIG. 8) selected according to a command of the user in the list. For example, in the list of the name of the person, the name of the person is identifiably displayed by giving a mark such as a star to a first part of the name of the person corresponding to each person or changing a color of the name of each person.

Alternatively, the page editing unit 36 may display the list of the names of the persons appearing in the individual image or the common image selected according to a command of the user on the image display unit.

Accordingly, the user easily knows the names of the person appearing in the individual image and the common image.

In a case where the display common page is edited, the image evaluation unit 20 may evaluate the images and may calculate the scores based on the analysis result of the plurality of images. In a case where the number of appearances of the specific person on the common images is greater than the average number of appearances of the plurality of persons, the page editing unit 36 may select the common images of which the scores are less than a threshold value from the common images in which the specific person appears, may display, as the deletion candidate images, the selected common images on the image display unit, and may delete the deletion candidate image selected according to a command of the user from the deletion candidate images displayed on the image display unit from the display common page.

Accordingly, the user can know the common images of which the scores are less than the threshold value among the common images in which the specific person appears, and can delete the common images in order from the image having, for example, the lowest score. The threshold value may be automatically set, or may be set by the user.

In a case where the number of appearances of the specific person on the common images is greater than the average number of appearances of the plurality of persons and the number of appearances of another person appearing on one common image which is smaller than the average number of appearances of the plurality of persons is further decreased by deleting one common image from the common images in which the specific person appears, the page editing unit 36 may select, as the deletion candidate images, the common images in which another person does not appear from the common images in which the specific person appears and display the selected common image on the image display unit, and may delete the deletion candidate image selected according to a command of the user from the deletion candidate images displayed on the image display unit from the display common page.

Accordingly, the user can know the deletion candidate images in the same manner, and it is possible to prevent the number of appearances of the person having the small number of appearances on the common images from being further decreased.

An alarm for confirming whether or not to delete the deletion candidate images may be produced by the alarm generation unit 38 before the deletion candidate images are deleted by the page editing unit 36. The alarm may be sound, or may be an alarm message.

In a case where the display common page is edited, the image evaluation unit 20 may evaluate the images and may calculate the scores based on the analysis results of the plurality of images. In a case where the number of appearances of the specific person on the common images is less than the average number of appearances of the plurality of persons, the page editing unit 36 may select the common images of which the scores are equal to or greater than the threshold value from the common images in which the specific person appears, may display, as adoption candidate images, the selected common images on the image display unit, and may lay an adoption candidate image selected according to a command of the user from the adoption candidate images displayed on the image display unit out on the display common page.

Accordingly, the user can know the common images of which the scores are equal to or greater than the threshold value among the common images in which the specific person appears, and can lay out the common images in order from the common image having the highest score. Similarly, the threshold value may be automatically set, or may be set by the user.

In a case where the number of appearances of the specific person on the common images is less than the average number of appearances of the plurality of persons and the number of appearances of another person appearing in one common image which is larger than the average number of appearances of the plurality of persons is further increased by adding one common image among the common images in which the specific person appears, the page editing unit 36 may select the common images in which a person other than another person appears from the common images in which the specific person appears, may display, as the adoption candidate images, the selected common images on the image display unit, and may lay the adoption candidate image selected according to a command of the user from the adoption candidate images displayed on the image display unit out on the display common page.

Accordingly, the user can know the adoption candidate images in the same manner, and it is possible to prevent the number of appearances of the person having the large number of appearances on the common image from being further increased.

In a case where the number of common images within the display common page is fixed and one common image selected according to a command of the user is deleted as the deletion common image from the display common page, the page editing unit 36 may delete the deletion common image from the display common page, selects, addition candidate images, images which are other than the individual images and the common images and in which the same person as one or more persons of three or more persons appearing in the deletion common image appears among the plurality of images, and may add one addition candidate image of the addition candidate images to the display common page.

Accordingly, it is possible to assist the user to simply delete the deletion common image from the display common page while securing equality between the numbers of appearances of the persons on the display common page as much as possible.

In this case, the page editing unit 36 can select, as one addition candidate image to be added to the display common page, the addition candidate image in which all the same three or more persons as three or more persons appearing in the deletion common image appear from the addition candidate images selected from the plurality of images in preference to the addition candidate images other than the addition candidate image in which all the same three or more persons as three or more persons appearing in the deletion common image appear, and can add the selected addition candidate image.

In a case where there is no addition candidate image in which all the same three or more persons as three or more persons appearing in the deletion common image appear among the addition candidate images, the page editing unit 36 can repeatedly exclude the persons from three or more persons appearing in the deletion common image in order from the person having the largest number of appearances on the display common page to the person having the smallest number of appearances until there is the addition candidate image in which all the same persons as the persons other than the person excluded from three or more persons appearing in the deletion common image appear, can select, as one addition candidate image, the addition candidate image in which all the same persons as the persons other than the person excluded from three or more persons appearing in the deletion common image appear from the addition candidate images, and can add the selected addition candidate image.

Figure 9:
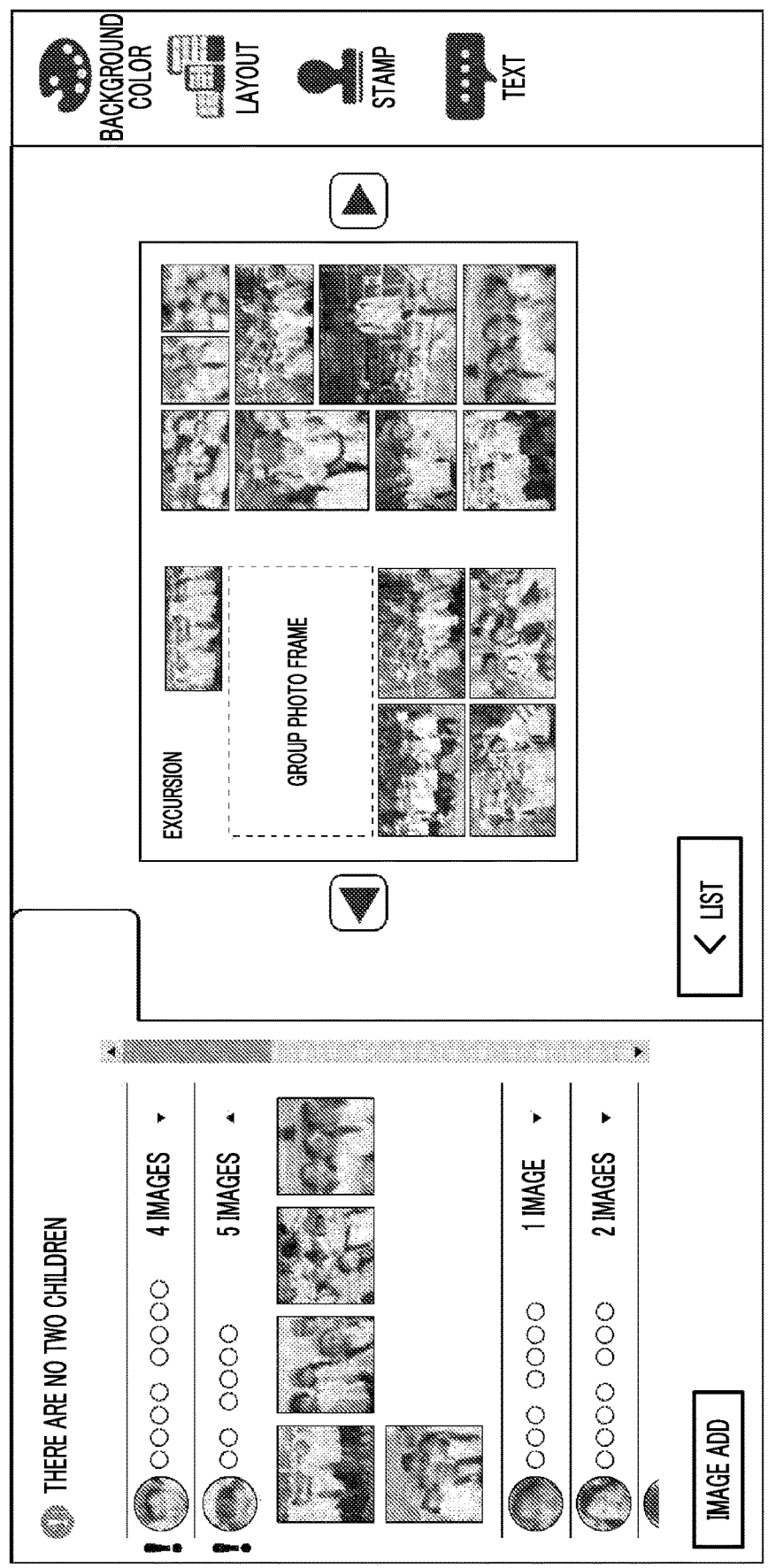
FIG. 9 is a conceptual diagram showing an editing screen of a common page.

FIG. 9 is an example of an editing screen of the common page.

For example, a list of the face images of the preschoolers is displayed in a region of a left portion of the editing screen. It is possible to change the preschoolers to be displayed in the region of the list of the face images of the preschoolers by displaying a scroll bar at a right portion within the region of the list of the face images of the preschoolers or moving, for example, a scroll box up and down. In a case where the number of addition candidate images in which each preschooler appears is displayed on a right side of the face image of each preschooler and the user selects the face image of each preschooler by clicking or tapping the face image, the addition candidate images in which the preschooler of which the face image is selected appears are displayed.

An alarm related to the number of appearances of each preschooler on the common page such as "there are no two children" on an upper side of the region of the list of the face image of the preschooler is displayed and "!" is displayed on a left side of the face image of the preschooler who is not on the common page by the alarm generation unit 38. Since the face image of the preschooler for which the alarm is produced is displayed so as to be moved toward an upper portion of the list of the face images of the preschoolers, the teacher can immediately ascertain a problem related to the number of appearances of each preschooler on the common page. A button of "image add" for adding a new image is displayed on a lower side of the region of the list of the face images of the preschoolers.

The common page of the photobook automatically created by the image processing device 10 is created such that the numbers of appearances of the preschoolers are equalized, and the alarm related to the number of appearances of each preschooler is not displayed by the alarm generation unit 38. However, even in a case where the common page is created such that the numbers of appearances of the preschoolers are equalized, the alarm is produced in a case where the teacher wants to actually perform the editing such as the addition, the deletion, or the switching of the image while seeing a layout result of the common page. As stated above, in a case where the common page is edited by the teacher and the number of appearances of each preschooler on the common page is changed, the alarm related to the number of appearances of each preschooler may be displayed by the alarm generation unit 38.

The common page which is a two-page spread page is displayed in a region of the central portion of the editing screen. An image of a character string of "excursion" which is a title of this common page is laid out in an upper left portion within the common page by the layout unit 34. Buttons for displaying the next and previous common pages are displayed on a right side and a left side of the common page, and a button of "list" for performing normal display and enlargement display of the common page by switching between display and non-display of the list of the preschoolers is displayed at a lower left portion of the region of the central portion of the editing screen.

A button of "background color" for changing a background color of the common page, a button of "layout" for changing the layout of the common page, a button of "stamp" for editing a stamp to be added to the common page, and a button of "text" for editing a comment to be added to the common page are displayed as buttons for editing the common page in a region of a right portion of the editing screen.

Figure 10:
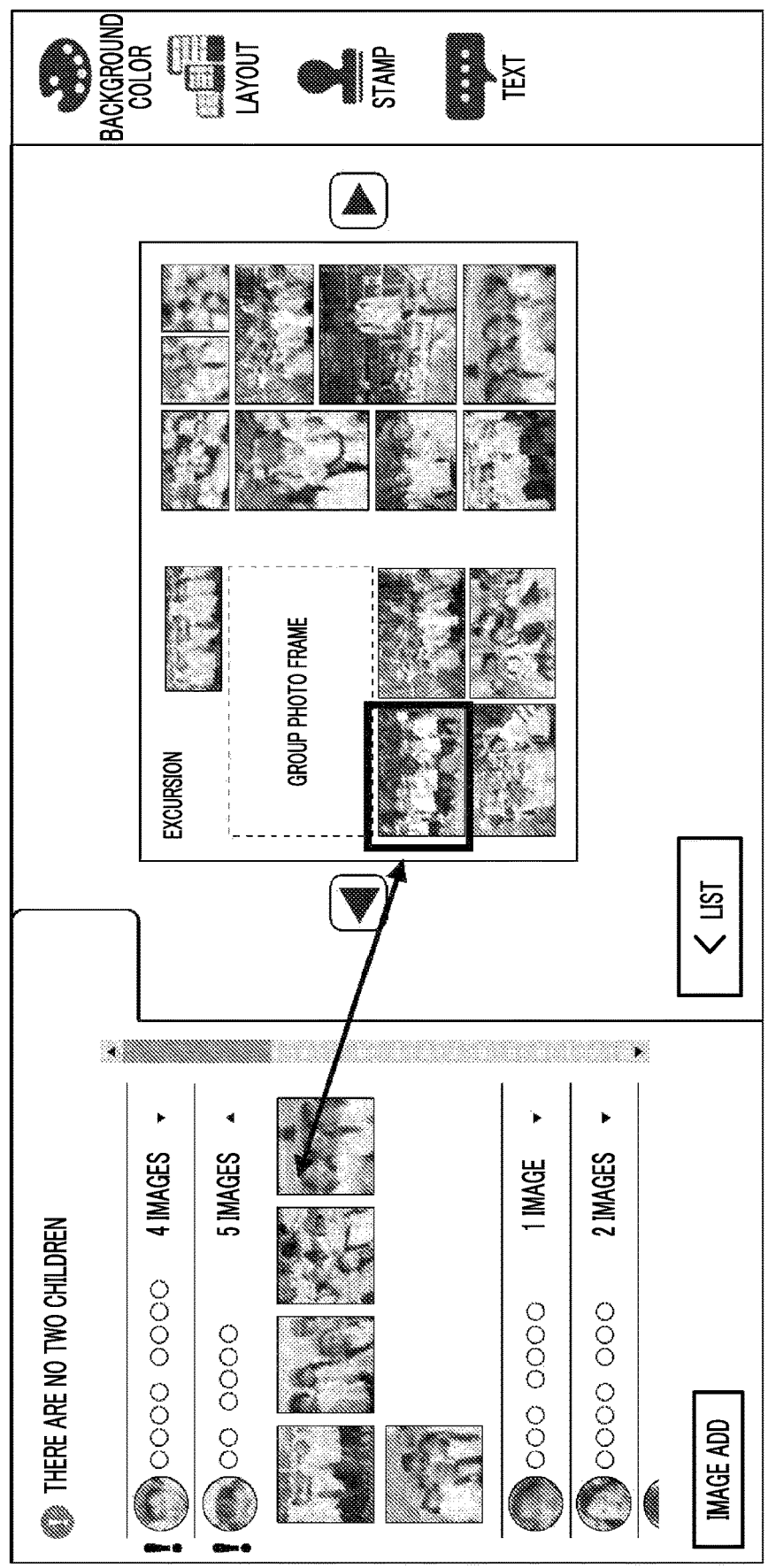
FIG. 10 is a conceptual diagram showing a scene in which one deletion common image is deleted from the common page and one addition candidate image is added.

As shown in FIG. 10, for example, it is assumed that one deletion common image surrounded by a frame line is deleted on the display common page and one addition candidate image of the addition candidate images in which the second preschooler from the top within the list of the face images of the preschoolers appears is instead added to the display common page.

In a case where three persons of AAA, BBB, and CCC appear together in the deletion common image and there is the addition candidate image in which three persons of AAA, BBB, and CCC appear together, the page editing unit 36 selects, as one addition candidate image, the addition candidate image in which three persons of AAA, BBB, and CCC appear together from the addition candidate images.

Meanwhile, in a case where there is no addition candidate image in which three persons of AAA, BBB, and CCC appear together and the number of appearances on the display common page becomes larger in order of AAA, BBB, and CCC, the page editing unit 36 excludes AAA from AAA, BBB, and CCC. In a case where there is the addition candidate image in which two persons of BBB and CCC appear together, the page editing unit selects, as one addition candidate image, the addition candidate image in which two persons of BBB and CCC appear together from the addition candidate images. In a case where there is no addition candidate image in which two persons of BBB and CCC appear together, the page editing unit 36 excludes BBB from BBB and CCC, and in a case where there is the addition candidate image in which only CCC appears, the page editing unit selects, as one addition candidate image, the addition candidate image in which only CCC appears from the addition candidate images.

In a case where the number of appearances of each person of three or more persons appearing in the deletion common images on the display common page is 1 and there is no addition candidate image in which all the same three or more persons as three or more persons appearing in the deletion common images appear among the addition candidate images, the page editing unit 36 may delete common images by a count which corresponds to the number of persons appearing in the deletion common image minus one in addition to the deletion common image from the display common page, and may add three or more addition candidate images in which each of the same three or more persons as three or more persons appearing in the deletion common image to the display common page instead of one addition candidate image.

Accordingly, in a case where the deletion common image is deleted from the display common page, even though there is the plurality of persons of which the number of appearances on the display common page is zero (0), it is possible to prevent the numbers of appearances of the plurality of persons on the display common page from being zero (0).

In this case, for example, the page editing unit 36 can delete common images by a count which corresponds to the number of persons appearing in the deletion common image minus one in order from the common image in which the person having the largest number of appearances on the display common page appears to the common image in which the person having the smallest number of appearances appears.

Figure 11:
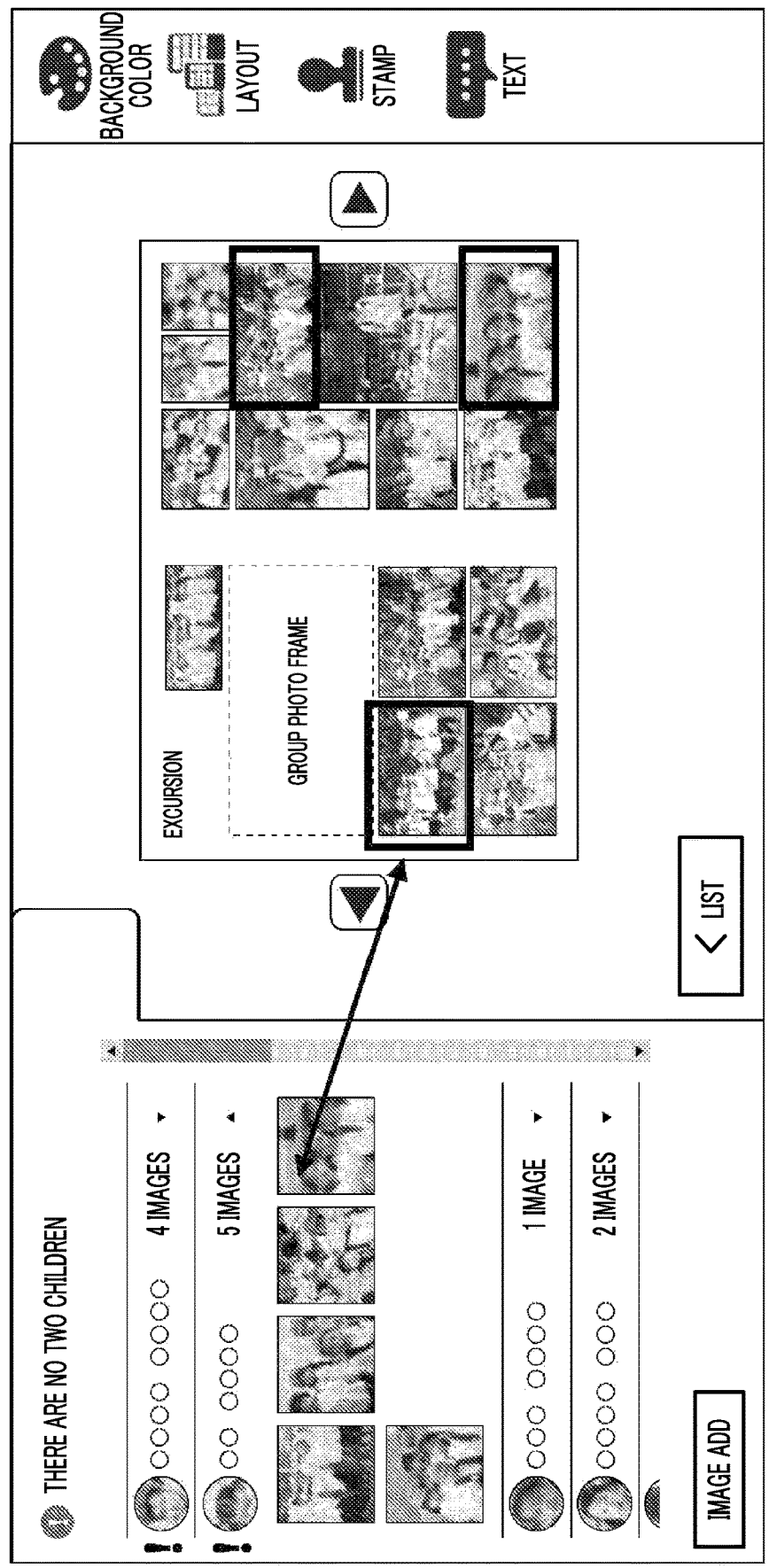
FIG. 11 is a conceptual diagram showing a scene in which two common images are deleted in addition to the deletion common image from the common page and three addition candidate images are added.

On the display common page of FIG. 11, the common image surrounded by a frame line on the left side is, for example, the deletion common image in which three persons of AAA, BBB, and CCC appear together. In a case where this deletion common image is deleted, the numbers of appearances of AAA, BBB, and CCC on the display common page are one, and there is no addition candidate image in which three persons of AAA, BBB, and CCC appear together, the page editing unit further deletes two common images from the display common page as represented so as to be surrounded by two frame lines on the right side on the display common page of FIG. 11 in addition to the deletion common image, and adds three addition candidate images in which AAA, BBB, and CCC individually appear to the display common page.

FIG. 11 shows an example of a case where the deletion common image in which three persons of AAA, BBB, and CCC appear together is deleted and three images in total are switched, but four or more images may be necessarily switched. For example, in a case where the deletion common image in which four persons of AAA, BBB, CCC, and DDD appear together is deleted, the numbers of appearances of AAA, BBB, CCC, and DDD on the display common page are one, and there is no addition candidate image in which four persons of AAA, BBB, CCC, and DDD appear together, the page editing unit further deletes three common images from the display common page in addition to the deletion common image, and adds four addition candidate images in which AAA, BBB, CCC, and DDD individually appear to the display common page. That is, the same number of images as the number of persons appearing in the deletion common image are replaced.

In a case where the number of common images within the display common page is variable, the number of appearances of each of three or more persons appearing in the deletion common image on the display common page is one, and there is no addition candidate image in which all the same three or more persons as three or more persons appearing in the deletion common image appear among the addition candidate images, the page editing unit 36 may delete the deletion common image from the display common page, and may add three or more addition candidate images in which each of the same three or more persons as three or more persons appearing in the deletion common image appears to the display common page instead of one addition candidate image among the addition candidate images.

In a case where the number of common images within the display common page is variable, it is possible to add the addition candidate image to the display common page without deleting the common image in addition to the deletion candidate image.

For example, in a case where the deletion common image in which three persons of AAA, BBB, and CCC appear together is deleted, the numbers of appearances of AAA, BBB, and CCC are one, and there is no addition candidate image in which three persons of AAA, BBB, and CCC on the display common page appear together, the page editing unit deletes the deletion common image, and adds three addition candidate images in which AAA, BBB, and CCC individually appear to the display common page. In this case, the number of common images within the display common page is increased by two, but the numbers of appearances of AAA, BBB, and CCC on the display common page are one, and are not changed.

The page editing unit 36 may automatically select one addition candidate image from the addition candidate images without requiring a command of the user, and may add the selected addition candidate image to the display common page.

Alternatively, as shown in FIG. 10, the page editing unit 36 may display the addition candidate image on the image display unit, and may add one addition candidate image selected according to a command of the user from the addition candidate image displayed on the image display unit to the display common page.

The addition candidate image in which each preschooler appears is displayed within the list of the face images of the preschoolers in FIG. 10. Alternatively, for example, the page editing unit 36 may display an editing window different from the editing screen in a region of a lower portion of the editing screen of the common page, and may display, as a list, the addition candidate image in which the same persons as one or more persons of three or more persons appearing in the deletion common image appear on the editing screen or the editing window, as shown in FIG. 8. On the addition candidate images displayed on the image display unit, the page editing unit 36 may identifiably display the addition candidate image in which the number of appearances of each person on the display common page is set to be equal to the average number of appearances of the plurality of persons, that is, the addition candidate image in which the equality between the numbers of appearances of the persons on the display common page as much as possible can be secured by giving a mark such as a star to this addition candidate image or surrounding this addition candidate image by a frame line.

In a case where the number of common images within the display common page is fixed and one image which is other than the individual images and the common images and is selected according to a command of the user from the plurality of images is added as the addition common image to the display common page, the page editing unit 36 may select, as replacement candidate images, the common image in which the same persons as one or more persons of all the persons appearing in the addition common image appear from the display common page, may delete one replacement candidate image of the replacement candidate images from the display common page, and may add the addition common image to the display common page.

Accordingly, it is possible to assist the user to simply add the addition common image to the display common page while securing the equality between the numbers of appearances of the persons on the display common page as much as possible.

In this case, the page editing unit 36 can select, as one replacement candidate image, the replacement candidate image in which all the same persons as all the persons appearing in the addition common image appears from the replacement candidate images in preference to the replacement candidate image other than the replacement candidate image in which all the same persons as all the persons appearing in the addition common image appear, and can delete the selected replacement candidate image.

In a case where there is no replacement candidate image in which all the same persons as all the persons appearing in the addition common image appear among the replacement candidate images, the page editing unit 36 can repeatedly exclude the persons in order from the person having the largest number of appearances on the display common page to the person having the smallest number of appearances among all the persons appearing in the addition common image until there is the replacement candidate image in which all the same persons as persons other than the person excluded from all the persons appearing in the addition common image appear, can select, as one replacement candidate image, the replacement candidate image in which all the same persons as the persons other than the person excluded from all the persons appearing in the addition common image appear from the replacement candidate images, and can delete the selected replacement candidate image.

For example, in a case where the addition candidate image is added to the display common page, it is assumed that the page editing unit deletes one replacement common image from the display common page and instead adds one addition candidate image to the display common page.

In a case where three persons of AAA, BBB, and CCC appear together in the addition common image and there is the replacement candidate image in which three persons of AAA, BBB, and CCC appear together, the page editing unit 36 selects, as one replacement candidate image, the replacement candidate image in which three persons of AAA, BBB, and CCC appear together from the replacement candidate images.

Meanwhile, in a case where there is no replacement candidate image in which three persons of AAA, BBB, and CCC appear together and the number of appearances on the display common page becomes larger in order of AAA, BBB, and CCC, the page editing unit 36 excludes AAA from AAA, BBB, and CCC, and in a case where there is the replacement candidate image in which two persons of BBB and CCC appear together, the page editing unit selects, as one replacement candidate image, the replacement candidate image in which two persons of BBB and CCC appear together from the replacement candidate images. In a case where there is no replacement candidate image in which two persons of BBB and CCC appear together, the page editing unit 36 excludes BBB from BBB and CCC, and in a case where there is the replacement candidate image in which only CCC appears, the page editing unit selects, as one replacement candidate image, the replacement candidate image in which only CCC appears from the replacement candidate images.

In a case where the addition common image is an image in which any of the plurality of persons does not appear, the page editing unit 36 may select, as one replacement candidate image, one common image of the common candidate images in which the person having the largest number of appearances on the display common page appears from the replacement candidate images, and may delete the selected common image.

As stated above, in a case where the image in which the person does not appear is added, it is possible to secure the equality between the numbers of appearances of the persons on the display common page as much as possible, and it is also possible to assist the user to simply add the addition common image to the display common page.

The page editing unit 36 may automatically select one replacement candidate image from the replacement candidate images without requiring a command of the user, and may delete the selected replacement candidate image from the display common page.

Alternatively, the page editing unit 36 may display the replacement candidate images on the image display unit, and may delete one replacement candidate image selected according to a command of the user from the replacement candidate images displayed on the image display unit from the display common page.

Alternatively, for example, as shown in FIG. 8, the page editing unit 36 may display an editing window different from the editing screen in a region of a lower portion of the editing screen of the common page, and may display, as a list, the replacement candidate images on the editing screen or the editing window. The page editing unit 36 may identifiably display the replacement candidate images such that the number of appearances of each person on the display common page is set to be the average number of appearances of the plurality of persons of the replacement candidate images displayed on the image display unit by giving a mark such as a star to the replacement candidate image or surrounding the replacement candidate image by a frame line.

However, in the case of the aforementioned examples, there is a possibility that the common image which is not designated by the user is automatically deleted from the display common page.

In contrast, in a case where one or more common images are selected as deletion exclusion images from the display common page according to a command of the user, the page editing unit 36 may not delete the deletion exclusion image from the display common page.

Figure 12:
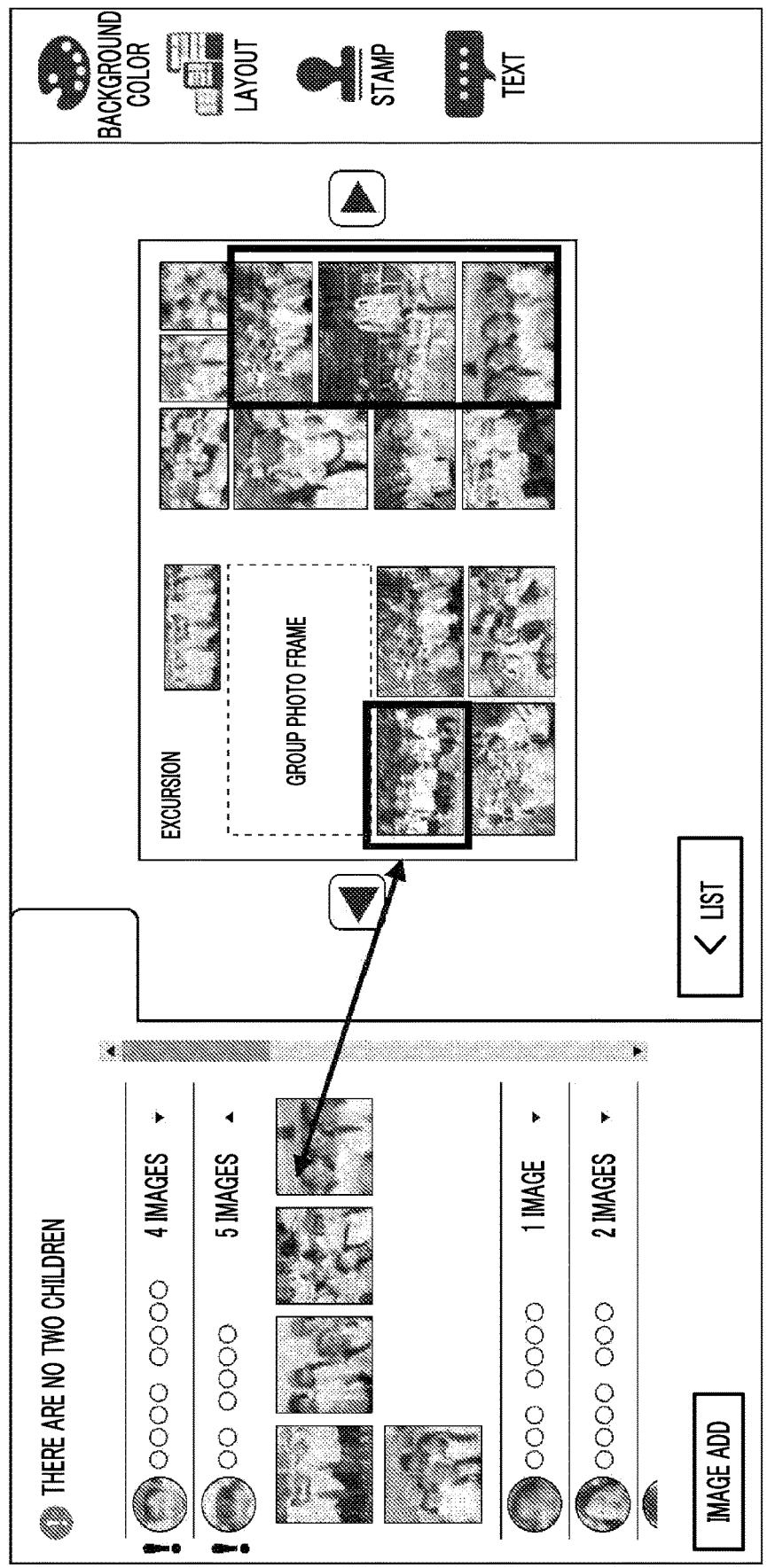
FIG. 12 is a conceptual diagram showing a scene in which the common image desired not to be automatically deleted from the common page is selected.

Accordingly, for example, the user can select the common image desired not to be automatically deleted from the display common page as represented so as to be surrounded by a frame line of a right side on the display common page of FIG. 12, and can set such that the selected common image is not automatically deleted.

Even though the numbers of appearances of the persons are equalized on the display common page, there may be an imbalance between the numbers of appearances of the persons on the entire photo album.

In contrast, for example, the page editing unit 36 may exclude the person, may delete the common image, or may identifiably display the candidate image based on, for example, the number of appearances with consideration for the number of appearances of each person in the entire photo album in addition to the number of appearances of each person on the display common page.

Figure 13:
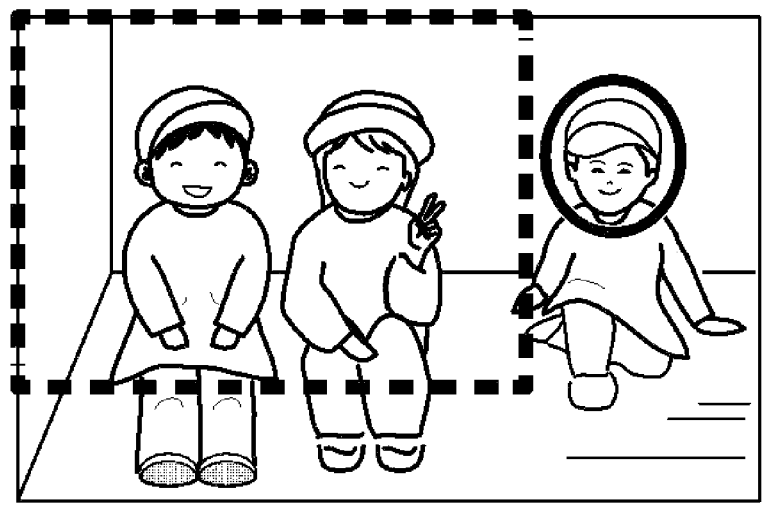
FIG. 13 is a conceptual diagram showing a state in which a specific person is deleted from the common image in which the specific person appears through trimming.

As shown in FIG. 13, in a case where the number of appearances of the specific person on the common image is greater than the average number of appearances of the plurality of persons, the page editing unit 36 may delete the specific person from the common image in which the specific person appears by trimming the common image in which the specific person appears.

In FIG. 13, an image in which one person surrounded by a circle, that is, the specific individual is deleted through the trimming, and two persons surrounded by a broken-line square appear is illustrated.

Accordingly, it is possible to easily reduce the number of appearances of the specific person having the large number of appearances on the common images.

TABLE 4

| Name | Entire | | Display common page | |
|------|--------|-----|-----|-----|
|      | Main   | Sub | Main | Sub |
| AAA  | 19     | 5   | 1   | 0   |
| BBB  | 3      | 7   | 1   | 1   |
| CCC  | 3      | 4   | 0   | 0   |
| ...  | ...    | ... | ... | ... |

In a case where the number of appearances of the specific person on the common image is counted at the time of editing the display common page, the image analysis unit 18 may detect the sizes of the faces of the persons appearing in the common image, and the appearance number count unit 32 may count, as a main appearance number, the number of appearances of each person of which the size of the face is equal to or greater than a threshold value on the common images, as represented in Table 4. The appearance number count unit may count, as a sub appearance number, the number of appearances of each person of which the size of the face on the common image is less than the threshold value, and may count the main and sub appearance numbers for the entire photo album.

In this case, the page editing unit 36 can use the main appearance number of the specific person instead of the number of appearances of the specific person, and can use the average main appearance number of the plurality of persons instead of the average number of appearances of the plurality of persons.

Even though the number of appearances is large, in a case where the size of the face of the child appearing in the common image is small, the parents of the child feel dissatisfied. The main appearance number is used, and thus, it is possible to equalize the numbers of appearances on the common images in which the person of which the size of the face is equal to or greater than the threshold value appears.

The threshold value may be automatically set, or may be set by the user. In a case where the threshold value is automatically set, the threshold value of the size of the face may be determined by a ratio of the size of the face to the size of the photo album or a ratio of the size of the face to the size of the common image laid out on the display common page.

In a case where the display individual page is edited, the intimacy calculation unit 28 may calculate the degree of intimacy between the specific individual and each person other than the specific individual based on the analysis result of the plurality of images, and the page editing unit 36 may select the image for editing the display individual page from the plurality of images, may display, as the editing candidate image, the selected image on the image display unit, and may preferentially display the editing candidate image in which the person of which the degree of intimacy with the specific individual is equal to or greater than the threshold value appears on the editing candidate image.

Accordingly, the user can easily use, as the editing candidate image, the image in which another person of which the degree of intimacy with the specific individual is high appears.

In a case where the display individual page is edited, a list of the names of the persons of which the degree of intimacy with the specific individual is equal to or greater than the threshold value may be displayed on the image display unit.

Accordingly, the user selects a desired person from the list of the names of the persons of which the degree of intimacy with the specific individual is equal to or greater than the threshold value, and thus, to the user can display, as the editing candidate image, the image in which a person who is close to the specific individual appears on the image display unit.

Even though the individual image is selected, the intimacy calculation unit 28 may calculate the degree of intimacy between the specific individual and each person other than the specific individual based on the analysis result of the plurality of images, and the image selection unit 30 may preferentially select, as the individual image, the image in which the person of which the degree of intimacy with the specific individual is equal to or greater than the threshold value appears from the plurality of images.

Accordingly, in a case where the layout unit 34 automatically lays out the individual page, it is possible to preferentially use, as the individual image, the image in which another person of which the degree of intimacy with the specific individual is high appears.

The order quantity information storage unit 40 stores the information of the order quantity of the images ordered to be printed. Thus, in a case where the display common page is edited, the page editing unit 36 can select the image for editing the display common page from the plurality of images on the image display unit, can display, as the editing candidate image, the selected image, and can identifiably display the editing candidate image of which the order quantity of the images ordered to be printed in the past is equal to or greater than a threshold value among the editing candidate images displayed on the image display unit, as shown in the drawing. For example, it is possible to identifiably display the editing candidate image by giving a mark such as a star to the editing candidate image.

The images of which the order quantity is large are regarded as important images in common for the preschoolers and the parents thereof. Accordingly, the editing candidate images of which the past order quantity is equal to or greater than the threshold value are identifiably displayed, and thus, it is possible to edit the display common page by using the important images in common for the preschoolers and the parents thereof. The threshold value may be automatically set, or may be set by the user.

Similarly, the order quantity information storage unit 40 stores the information of the order quantity of the images ordered to be printed. Thus, in a case where the common images are selected, the image selection unit 30 can preferentially select, as the common images, the images of which the order quantity of the images ordered to be printed in the past is equal to or greater than the threshold value from the plurality of images.

Accordingly, in a case where the layout unit 34 automatically lays out the common page, it is possible to preferentially use, as the common images, the important images in common for the preschoolers and the parents thereof.

Figure 14:
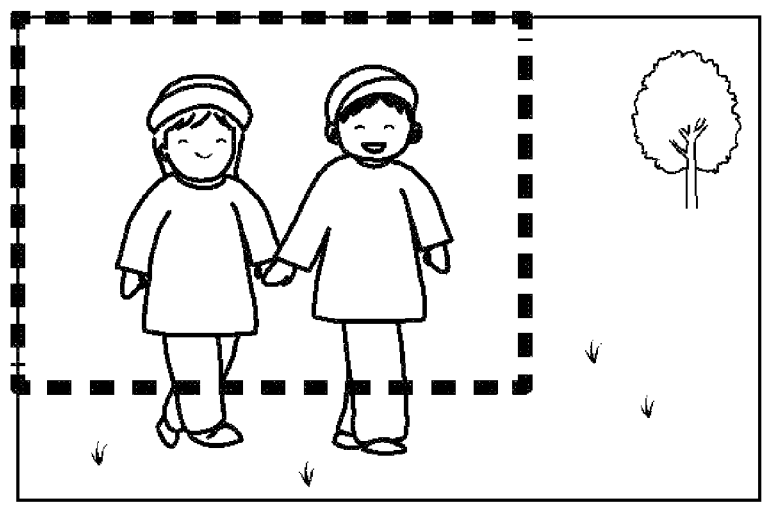
FIG. 14 is a conceptual diagram showing images ordered to be printed after the trimming is performed in the past.

As shown in FIG. 14, the trimming information storage unit 42 stores the trimming information of the images ordered to be printed after the trimming is performed. Thus, in a case where the display individual page is edited, the page editing unit 36 can perform the same trimming as that for the images ordered to be printed on the individual images based on the trimming information in a case where the individual images laid out on the display individual page are the images ordered to be printed after the trimming is performed in the past.

In FIG. 14, the images in which two persons surrounded by a broken-line square appear are extracted through the trimming.

A person who orders the images to be printed after the trimming is regarded as preferring the images after the trimming to the images before the trimming. Accordingly, the same trimming as that for the images ordered to be printed is performed on the individual images, and thus, it is possible to render the individual pages into preferable pages for this person.

The layout unit 34 may lay the common images out such that the number of persons appearing in the common images laid out in a region having a large size is greater than that in the common images laid out in a region having a small size on the common page.

The image selection unit 30 selects, as the common images, the images in which three or more persons of the plurality of images appear. However, in a case where many persons appear in the image, since the size of the face of each person becomes small, it is desirable that the number of persons appearing in the image is adjusted according to the size of the image in a case where the image is disposed on the common page. The size of the face of the person appearing in the common image in a case where the same common images are laid out in the region having the large size is greater than that in a case where the same common images are laid out in the region having the small size. Accordingly, the common images are laid out as stated above, and thus, it is possible to render the size of the face of the person appearing in the common image into a more preferable size.

The present invention is not limited to the kindergarten and the preschool, and may be similarly used in a case where various photo albums are created by using the plurality of images in which the plurality of persons appear in the group including the plurality of persons such as a plurality of students at school and a plurality of colleagues at the company.

In the device of the present invention, a hardware configuration of processing units that perform various processes of the command obtaining unit 12, the name registration unit 14, the image obtaining unit 16, the image analysis unit 18, the image evaluation unit 20, the image classification unit 22, the association unit 24, the individual designation unit 26, the intimacy calculation unit 28, the image selection unit 30, the appearance number count unit 32, the layout unit 34, the page editing unit 36, the alarm generation unit 38, the order quantity information storage unit 40, and the trimming information storage unit 42 may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing device
12: command obtaining unit
14: name registration unit
16: image obtaining unit
18: image analysis unit
20: image evaluation unit
22: image classification unit
24: association unit
26: individual designation unit
28: intimacy calculation unit
30: image selection unit
32: appearance number count unit
34: layout unit
36: page editing unit
38: alarm generation unit
40: order quantity information storage unit
42: trimming information storage unit

What is claimed is:

1. An image processing device that creates a photo album including one or more individual pages which correspond to a specific individual and one or more common pages which correspond to a plurality of persons including the specific individual, the device comprising a processor configured to:
obtain a command input from a user;
obtain a plurality of images in which the plurality of persons appears;
analyze the plurality of images and detect a person appearing in each of the plurality of images;
designate the specific individual among the plurality of persons according to a command of the user;
select individual images used on the individual page and common images used on the common page from the plurality of images based on the analysis result of the plurality of images and the specific individual;
count the number of appearances of each of the plurality of persons on the common images based on the analysis result of the plurality of images; and
display, as a display individual page, the individual page in which the individual images are laid out on an image display and edit a layout of the display individual page according to a command of the user, and display, as a display common page, the common page in which the common images are laid out on the image display and edit a layout of the display common page according to a command of the user,
wherein the processor is configured to preferentially select, as the individual images, images in which two or less persons including the person corresponding to the specific individual appear, and select, as the common images, images which are other than the individual images and in which three or more persons appear such that the number of appearances of each person substantially becomes the average number of appearances of the plurality of persons, and
in a case where the number of common images within the display common page is fixed and one common image selected according to a command of the user is deleted as a deletion common image from the display common page, the processor is configured to delete the deletion common image from the display common page, select, as addition candidate images, images which are other than the individual images and the common images and in which the same person as one or more persons of three or more persons appearing in the deletion common image appears from the plurality of images, and add one addition candidate image of the addition candidate images to the display common page.

2. The image processing device according to claim 1, wherein the processor is configured to select, as the one addition candidate image, an addition candidate image in which all the same three or more persons as the three or more persons appearing in the deletion common image appear from the addition candidate images in preference to addition candidate images other than the addition candidate image in which all the same three or more persons as the three or more persons appearing in the deletion common image appear.

3. The image processing device according to claim 1, wherein the processor is configured to repeatedly exclude persons from the three or more persons appearing in the deletion common image in order from a person having the largest number of appearances on the display common page to a person having the smallest number of appearances until there is an addition candidate image in which all the same persons as persons other than the person excluded from the three or more persons appearing in the deletion common image appear, and select, as the one addition candidate image, the addition candidate image in which all the same persons as the persons other than the person excluded from the three or more persons appearing in the deletion common image appear from the addition candidate images.

4. The image processing device according to claim 1, wherein, in a case where the number of appearances of each of the three or more persons appearing in the deletion common image on the display common page is one and there is no addition candidate image in which all the same three or more persons as the three or more persons appearing in the deletion common image appear among the addition candidate images, the processor is configured to delete common images by a count which corresponds to the number of persons appearing in the deletion common image minus one in addition to the deletion common image from the display common page, and add three or more addition candidate images in which each of the same three or more persons as the three or more persons appearing in the deletion common image appears instead of the one addition candidate image among the addition candidate images to the display common page.

5. The image processing device according to claim 4, wherein the processor is configured to delete common images by a count which corresponds to the number of persons appearing in the deletion common image minus one in order from the common image in which the person having the largest number of appearances on the display common page appears to the common image in which the person having the smallest number of appearances appears.

6. The image processing device according to claim 1, wherein, in a case where the number of common images within the display common page is variable, the number of appearances of each of the three or more persons appearing in the deletion common image on the display common page is one, and there is no addition candidate image in which all the same three or more persons as the three or more persons appearing in the deletion common image appear among the addition candidate images, the processor is configured to delete the deletion common image from the display common page, and add three or more addition candidate images in which each of all the same three or more persons as the three or more persons appearing in the deletion common image appears instead of the one addition candidate image among the addition candidate images to the display common page.

7. The image processing device according to claim 1, wherein the processor is further configured to:
register names of the plurality of persons;
classify the plurality of images into a plurality of groups including the images in which each of the plurality of persons appears based on the analysis result of the plurality of images;
associate the name of each person with each of the plurality of groups including the images in which the person corresponding to the name of each person appears; and
lay the individual images out on the individual page and lay the common images out on the common page based on layout information,
wherein the processor is configured to designate a name of the specific individual among the names of the plurality of persons according to a command of the user,
the processor is configured to select the individual images and the common images from the plurality of images based on the analysis result of the plurality of images, the name of the specific individual, and the association,
the processor is configured to display, as the display individual page, the laid out individual page on the image display according to a command of the user, and display, as the display common page, the laid out common page on the image display according to a command of the user, and
the processor is configured to preferentially select, as the individual images, images in which two or less persons including the person corresponding to the name of the specific individual appear.

8. The image processing device according to claim 1, wherein the processor is configured to display the addition candidate images on the image display, and add one addition candidate image selected according to a command of the user from the addition candidate images displayed on the image display to the display common page.

9. The image processing device according to claim 8, wherein the processor is configured to identifiably display an addition candidate image such that the number of appearances of each person on the display common page substantially becomes the average number of appearances of the plurality of persons among the addition candidate images displayed on the image display.

10. An image processing device that creates a photo album including one or more individual pages which correspond to a specific individual and one or more common pages which correspond to a plurality of persons including the specific individual, the device comprising a processor configured to:
obtain a command input from a user;
obtain a plurality of images in which the plurality of persons appears;
analyze the plurality of images and detect a person appearing in each of the plurality of images;
designate the specific individual among the plurality of persons according to a command of the user;
select individual images used on the individual page and common images used on the common page from the plurality of images based on the analysis result of the plurality of images and the specific individual;
count the number of appearances of each of the plurality of persons on the common images based on the analysis result of the plurality of images; and
display, as a display individual page, the individual page in which the individual images are laid out on an image display and edit a layout of the display individual page according to a command of the user, and display, as a display common page, the common page in which the common images are laid out on the image display and edit a layout of the display common page according to a command of the user,
wherein the processor is configured to preferentially select, as the individual images, images in which two or less persons including the person corresponding to the specific individual appear, and select, as the common images, images which are other than the individual images and in which three or more persons appear such that the number of appearances of each person substantially becomes the average number of appearances of the plurality of persons, and
in a case where the number of common images within the display common page is fixed and one image which is other than the individual images and the common images and is selected according to a command of the user from the plurality of images is added as an addition common image to the display common page, the processor is configured to select, as replacement candidate images, common images in which the same person as one or more persons of all persons appearing in the addition common image appears from the display common page, delete one replacement candidate image of the replacement candidate images from the display common page, and add the addition common image to the display common page.

11. The image processing device according to claim 10, wherein the processor is configured to select, as the one replacement candidate image, a replacement candidate image in which all the same persons as all the persons appearing in the addition common image appear from the replacement candidate images in preference to replacement candidate images other than the replacement candidate image in which all the same persons as all the persons appearing in the addition common image appear.

12. The image processing device according to claim 11, wherein, in a case where there is no replacement candidate image in which all the same persons as all the persons appearing in the addition common image appear among the replacement candidate images, the processor is configured to repeatedly exclude persons from all the persons appearing in the addition common image in order from a person having the largest number of appearances on the display common page to a person having the smallest number of appearances until there is a replacement candidate image in which all the same persons as persons other than the person excluded from all the persons appearing in the addition common image appear, and select, as the one replacement candidate image, the replacement candidate image in which all the same persons as the persons other than the person excluded from all the persons appearing in the addition common image appear from the replacement candidate images.

13. The image processing device according to claim 10, wherein, in a case where the addition common image is an image in which none of the plurality of persons appear, the processor is configured to select, as the one replacement candidate image, one common image of the common images in which the person having the largest number of appearances on the display common page appears from the replacement candidate images.

14. The image processing device according to claim 10, wherein the processor is further configured to:
register names of the plurality of persons;
classify the plurality of images into a plurality of groups including the images in which each of the plurality of persons appears based on the analysis result of the plurality of images;
associate the name of each person with each of the plurality of groups including the images in which the person corresponding to the name of each person appears; and
lay the individual images out on the individual page and lay the common images out on the common page based on layout information,
wherein the processor is configured to designate a name of the specific individual among the names of the plurality of persons according to a command of the user,
the processor is configured to select the individual images and the common images from the plurality of images based on the analysis result of the plurality of images, the name of the specific individual, and the association,
the processor is configured to display, as the display individual page, the laid out individual page on the image display according to a command of the user, and display, as the display common page, the laid out common page on the image display according to a command of the user, and
the processor is configured to preferentially select, as the individual images, images in which two or less persons including the person corresponding to the name of the specific individual appear.

15. The image processing device according to claim 10, wherein the processor is configured to display the replacement candidate images on the image display, and delete one replacement candidate image selected according to a command of the user from the replacement candidate images displayed on the image display from the display common page.

16. The image processing device according to claim 15, wherein the processor is configured to identifiably display a replacement candidate image such that the number of appearances of each person on the display common page substantially becomes the average number of appearances of the plurality of persons among the replacement candidate images displayed on the image display.

17. The image processing device according to claim 10, wherein, in a case where one or more common images are selected as a deletion exclusion image from the display common page according to a command of the user, the processor is configured not to delete the deletion exclusion image from the display common page.

18. An image processing method of creating a photo album including one or more individual pages which correspond to a specific individual and one or more common pages which correspond to a plurality of persons including the specific individual, the method comprising:
obtaining, by a command obtaining unit, a command input from a user;
obtaining, by an image obtaining unit, a plurality of images in which the plurality of persons appears;
analyzing, by an image analysis unit, the plurality of images and detecting a person appearing in each of the plurality of images;
designating, by an individual designation unit, the specific individual among the plurality of persons according to a command of the user;
selecting, by an image selection unit, individual images used on the individual page and common images used on the common page from the plurality of images based on the analysis result of the plurality of images and the specific individual;
counting, by an appearance number count unit, the number of appearances of each of the plurality of persons on the common images based on the analysis result of the plurality of images; and
displaying, by a page editing unit, as a display individual page, the individual page in which the individual images are laid out on an image display and editing a layout of the display individual page according to a command of the user, and displaying, as a display common page, the common page in which the common images are laid out on the image display and editing a layout of the display common page according to a command of the user,
wherein, in the selecting of the individual images and the common images, images in which two or less persons including the person corresponding to the specific individual appear are preferentially selected as the individual images, and images which are other than the individual images and in which three or more persons appear such that the number of appearances of each person substantially becomes the average number of appearances of the plurality of persons are selected as the common images, and
in the editing of the layout of the display common page, in a case where the number of common images within the display common page is fixed and one common image selected according to a command of the user is deleted as a deletion common image from the display common page, the deletion common image is deleted from the display common page, images which are other than the individual images and the common images and in which the same person as one or more persons of three or more persons appearing in the deletion common image appears are selected as addition candidate images from the plurality of images, and one addition candidate image of the addition candidate images is added to the display common page.

19. An image processing method of creating a photo album including one or more individual pages which correspond to a specific individual and one or more common pages which correspond to a plurality of persons including the specific individual, the method comprising:
obtaining, by a command obtaining unit, a command input from a user;
obtaining, by an image obtaining unit, a plurality of images in which the plurality of persons appears;
analyzing, by an image analysis unit, the plurality of images and detecting a person appearing in each of the plurality of images;
designating, by an individual designation unit, the specific individual among the plurality of persons according to a command of the user;
selecting, by an image selection unit, individual images used on the individual page and common images used on the common page from the plurality of images based on the analysis result of the plurality of images and the specific individual;
counting, by an appearance number count unit, the number of appearances of each of the plurality of persons on the common images based on the analysis result of the plurality of images; and
displaying, by a page editing unit, as a display individual page, the individual page in which the individual images are laid out on an image display and editing a layout of the display individual page according to a command of the user, and displaying, as a display common page, the common page in which the common images are laid out on the image display and editing a layout of the display common page according to a command of the user,
wherein, in the selecting of the individual images and the common images, images in which two or less persons including the person corresponding to the specific individual appear are preferentially selected as the individual images, and images which are other than the individual images and in which three or more persons appear such that the number of appearances of each person substantially becomes the average number of appearances of the plurality of persons are selected as the common images, and
in the editing of the layout of the display common page, in a case where the number of common images within the display common page is fixed and one image which is other than the individual images and the common images and is selected according to a command of the user from the plurality of images is added as an addition common image to the display common page, common images in which the same person as one or more persons of all persons appearing in the addition common image appears are selected as replacement candidate images from the display common page, one replacement candidate image of the replacement candidate images is deleted from the display common page, and the addition common image is added to the display common page.

20. A non-transitory computer-readable recording medium having recorded thereon a program causing a computer to execute the steps of the image processing method according to claim 18.

* * * * *